(12) United States Patent
Evans, V et al.

(10) Patent No.: US 9,906,721 B2
(45) Date of Patent: Feb. 27, 2018

(54) APPARATUS AND METHOD TO RECORD A 360 DEGREE IMAGE

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/161,153

(22) Filed: May 20, 2016

(65) Prior Publication Data
US 2017/0126971 A1    May 4, 2017

Related U.S. Application Data

(60) Provisional application No. 62/325,922, filed on Apr. 21, 2016, provisional application No. 62/249,130,
(Continued)

(51) Int. Cl.
*H04N 5/232* (2006.01)
*G06T 5/50* (2006.01)
(Continued)

(52) U.S. Cl.
CPC ....... *H04N 5/23238* (2013.01); *G06T 3/0018* (2013.01); *G06T 3/0062* (2013.01);
(Continued)

(58) Field of Classification Search
None
See application file for complete search history.

(56) References Cited

U.S. PATENT DOCUMENTS 6,583,815 B1 *  6/2003  Driscoll, Jr. ........... G02B 13/06
                                                  348/211.3
6,795,113 B1    9/2004  Jackson et al.
(Continued)

FOREIGN PATENT DOCUMENTS

| TW | 201410016 A | 3/2014 |
|---|---|---|
| TW | 1442311 B | 6/2014 |
| WO | 2014106296 A1 | 7/2014 |

OTHER PUBLICATIONS

International Search Report and Written Opinion in PCT/US16/59497 dated Jan. 17, 2017, 10 pages.
(Continued)

*Primary Examiner* — Andy Rao
*Assistant Examiner* — Samuel D Fereja
(74) *Attorney, Agent, or Firm* — Perkins Coie LLP

(57) ABSTRACT

The technology disclosed herein combines wide angle lenses with normal lenses to create an undistorted 360° view of the surrounding environment. The normal lenses record an image of the surrounding environment in the areas where the wide angle lenses provide a distorted view. The wide angle lenses and the normal lenses can be part of a stand-alone imaging device, can be accessories to a mobile device, or can be integrated into a mobile device. Various ways to integrate the wide lenses and/or the normal lenses into the camera are disclosed herein.

26 Claims, 22 Drawing Sheets

Related U.S. Application Data filed on Oct. 30, 2015, provisional application No. 62/300,631, filed on Feb. 26, 2016.

(51) Int. Cl.

| | | |
|---|---|---|
| *G06T 3/00* | (2006.01) | |
| *G06T 5/00* | (2006.01) | |
| *H04N 5/225* | (2006.01) | |
| *G06T 3/40* | (2006.01) | |
| *H04N 5/247* | (2006.01) | |

(52) U.S. Cl.
CPC ............ *G06T 3/4038* (2013.01); *G06T 5/006* (2013.01); *G06T 5/50* (2013.01); *H04N 5/2252* (2013.01); *H04N 5/2254* (2013.01); *H04N 5/2258* (2013.01); *H04N 5/23216* (2013.01); *H04N 5/23241* (2013.01); *H04N 5/23293* (2013.01); *H04N 5/23296* (2013.01); *H04N 5/247* (2013.01); *G06T 2207/20221* (2013.01)

(56) References Cited

U.S. PATENT DOCUMENTS

| | | | |
|---|---|---|---|
| 6,954,310 | B2 | 10/2005 | Holloway et al. |
| 7,646,404 | B2 | 1/2010 | Liu et al. |
| RE43,490 | E | 6/2012 | Gullichsen et al. |
| 8,730,299 | B1 | 5/2014 | Kozko |
| 8,818,101 | B1* | 8/2014 | Lim .................. G06T 5/006 345/629 |
| 9,055,220 | B1* | 6/2015 | Kozko .................. H04N 5/2254 |
| 9,152,019 | B2 | 10/2015 | Kintner et al. |
| 9,521,321 | B1* | 12/2016 | Kozko .............. H04N 5/23238 |
| 2004/0061787 | A1 | 4/2004 | Liu et al. |
| 2005/0058360 | A1 | 3/2005 | Berkey et al. |
| 2006/0056056 | A1 | 3/2006 | Ahiska et al. |
| 2007/0236595 | A1 | 10/2007 | Pan et al. |
| 2008/0024594 | A1* | 1/2008 | Ritchey ................ H04N 5/2254 348/36 |
| 2009/0002797 | A1* | 1/2009 | Kwong ................ H04N 5/2259 359/225.1 |
| 2010/0002071 | A1 | 1/2010 | Ahiska |
| 2010/0033551 | A1* | 2/2010 | Agarwala ............ G06T 3/0018 348/36 |
| 2010/0045773 | A1* | 2/2010 | Ritchey .................. G02B 13/06 348/36 |
| 2010/0097442 | A1* | 4/2010 | Lablans .................... G03B 5/00 348/36 |
| 2010/0119172 | A1* | 5/2010 | Yu ........................... G06T 5/006 382/256 |
| 2011/0002544 | A1 | 1/2011 | Oshima |
| 2011/0032368 | A1 | 2/2011 | Pelling et al. |
| 2011/0211040 | A1* | 9/2011 | Lindemann ............ G01C 11/02 348/36 |
| 2012/0044391 | A1* | 2/2012 | Ni ........................ H04N 5/3572 348/242 |
| 2012/0169842 | A1 | 7/2012 | Chuang et al. |
| 2012/0242788 | A1 | 9/2012 | Chuang et al. |
| 2012/0257008 | A1 | 10/2012 | Taylor et al. |
| 2013/0258044 | A1 | 10/2013 | Betts-Lacroix et al. |
| 2013/0278715 | A1 | 10/2013 | Nutsch et al. |
| 2013/0321569 | A1* | 12/2013 | Agarwala ............ G06T 3/0018 348/36 |
| 2013/0329002 | A1 | 12/2013 | Tico |
| 2014/0002588 | A1 | 1/2014 | Ahiska |
| 2014/0049609 | A1 | 2/2014 | Wilson et al. |
| 2014/0210940 | A1 | 7/2014 | Barnes |
| 2014/0267586 | A1 | 9/2014 | Aguilar et al. |
| 2014/0267596 | A1* | 9/2014 | Geerds ................ H04N 5/2252 348/38 |
| 2014/0313377 | A1* | 10/2014 | Hampton ............. H05K 5/0217 348/241 |
| 2015/0103197 | A1 | 4/2015 | Djordjevic et al. |
| 2015/0189140 | A1 | 7/2015 | Sutton et al. |
| 2015/0212653 | A1* | 7/2015 | Cable .................... G06F 3/0423 345/175 |
| 2015/0244930 | A1* | 8/2015 | Ettinger ............. H04N 5/23222 348/207.1 |
| 2015/0358539 | A1* | 12/2015 | Catt ........................ G06T 5/006 348/38 |
| 2015/0373279 | A1* | 12/2015 | Osborne ............ G02B 13/0075 348/36 |
| 2016/0073104 | A1* | 3/2016 | Hillebrand ........... H04N 17/002 348/47 |
| 2016/0088280 | A1* | 3/2016 | Sadi ....................... H04N 19/54 348/48 |
| 2016/0198087 | A1* | 7/2016 | Georgiev ............... G03B 17/17 348/360 |
| 2016/0219217 | A1* | 7/2016 | Williams ........... H04N 5/23293 |
| 2016/0360104 | A1 | 12/2016 | Zhang et al. |
| 2017/0126972 | A1 | 5/2017 | Evans et al. |
| 2017/0163889 | A1 | 6/2017 | Evans et al. |

OTHER PUBLICATIONS

International Search Report and Written Opinion in PCT/US16/59535 dated Jan. 17, 2017, 12 pages.
Non-Final Office Action dated Feb. 1, 2017 in U.S. Appl. No. 15/336,689 of Evans V et al., filed Oct. 27, 2016, 18 pages.
Partial Search Report PCT/US16/59170 dated Mar. 7, 2017, 2 pages.
Notice of Allowance dated Aug. 14, 2017 for U.S. Appl. No. 15/336,588 of Evans V et al., filed Oct. 27, 2016.
U.S. Appl. No. 15/604,544 of Evans V et al. filed May 24, 2017.
U.S. Appl. No. 15/675,660 of Evans V et al. filed Aug. 11, 2017.
Office Action dated Jun. 8, 2017 for Taiwanese Patent Application No. 105134935, 16 pages.
International Report and Written Opinion dated May 19, 2017, for International Application No. PCT/US16/59170 dated May 19, 2017.
Restriction Requirement dated Mar. 2, 2017, for U.S. Appl. No. 15/336,588 of Evans et al., filed Oct. 27, 2016.
Notice of Allowance dated May 18, 2017 for U.S. Appl. No. 15/336,689 of Evans et al., filed Oct. 27, 2016.
Non-Final Office Action dated May 12, 2017 in U.S. Appl. No. 15/336,588 of Evans et al., filed Oct. 27, 2016.
Notice of Allowance dated Dec. 14, 2017 for Taiwan Patent Application No. 105134935 of Essential Products, Inc. filed on Oct. 28, 2016.
Office Action dated Jan. 2, 2018 for Taiwan Patent Application No. 105135223 of Essential Products, Inc. filed Oct. 31, 2016.
Notice of Allowance dated Sep. 7, 2017 for U.S. Appl. No. 15/336,689 of Evans et al., filed Oct. 27, 2016.

* cited by examiner

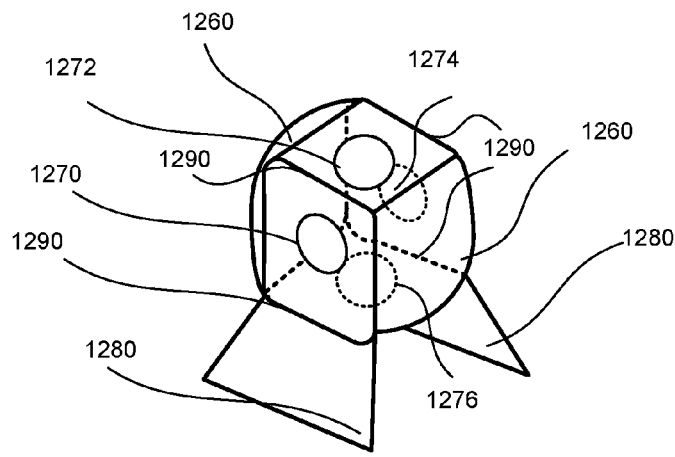
FIG. 12B
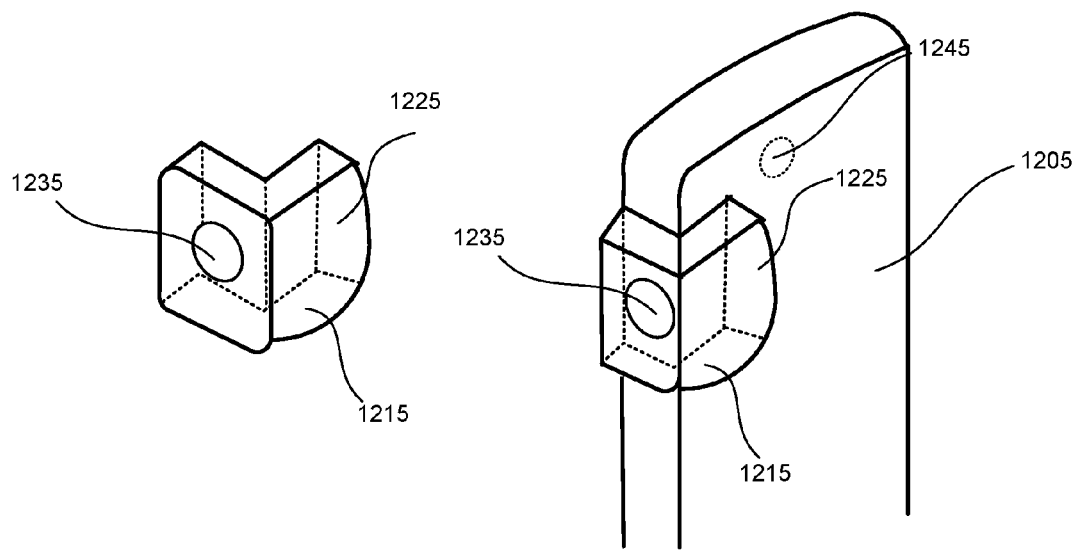
FIG. 12C  FIG. 12D

APPARATUS AND METHOD TO RECORD A 360 DEGREE IMAGE

CROSS-REFERENCE TO RELATED APPLICATIONS

This application claims priority to the: U.S. Provisional Patent Application Ser. No. 62/325,922, filed Apr. 21, 2016; U.S. Provisional Patent Application Ser. No. 62/249,130, filed Oct. 30, 2015; U.S. Provisional Patent Application Ser. No. 62/300,631, filed Feb. 26, 2016; all of which are incorporated herein by reference in their entirety.

TECHNICAL FIELD

The present application is related to an apparatus and method to record a 360° image, more specifically to apparatus and method capable of recording an undistorted full view of a surrounding environment.

BACKGROUND

Wide angle lenses used in 360° cameras suffer from image distortion at the periphery of the lens. The resulting image presents a distorted view of the surrounding environment by, for example, showing straight lines as bent, showing distorted proportions of surrounding objects, etc.

SUMMARY

Certain aspects of the technology disclosed herein combine wide angle lenses with normal lenses to create an undistorted 360° view of the surrounding environment. The normal lenses record an image of the surrounding environment in the areas where the wide angle lenses provide a distorted view. The wide angle lenses and the normal lenses can be part of a stand-alone imaging device, can be accessories to a mobile device, or can be integrated into a mobile device. Various ways to integrate the wide lenses and/or the normal lenses into the camera are disclosed herein.

BRIEF DESCRIPTION OF THE DRAWINGS

FIG. 12B is a stand-alone imaging device, according to one embodiment.

FIGS. 12C-12D show an imaging device configured to be a mobile device accessory, according to another embodiment.

DETAILED DESCRIPTION

Figure 1:
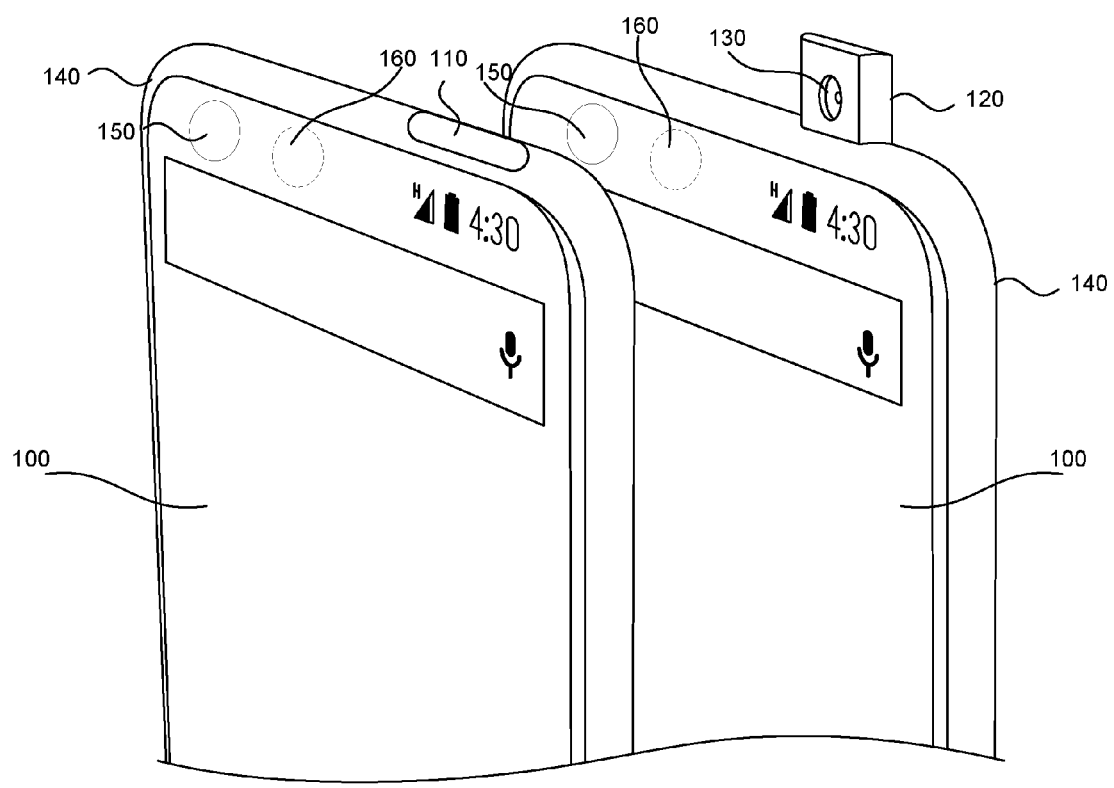
FIG. 1 shows an active and an inactive camera associated with the mobile device, according to one embodiment.

Certain aspects of the technology disclosed herein combine wide angle lenses with normal lenses to create an undistorted 360° view of the surrounding environment. The normal lenses record an image of the surrounding environment in the areas where the wide angle lenses provide a distorted view. The wide angle lenses and the normal lenses can be part of a stand-alone imaging device, can be accessories to a mobile device, or can be integrated into a mobile device. Various ways to integrate the wide lenses and/or the normal lenses into the camera are disclosed herein.

In various embodiments disclosed herein, the mobile device can have a plurality of cameras, where the plurality of cameras comprises one or more camera embodiments disclosed here.

In various embodiments disclosed herein, an image can be a video, and the camera recording an image can be a camera recording a video.

Terminology

Brief definitions of terms, abbreviations, and phrases used throughout this application are given below.

Reference in this specification to "360° view" includes both a view obtained when a camera rotates 360° around a yaw axis, and a view obtained when the camera rotates 360° around a pitch axis. Reference in this specification to "360° image" includes both an image obtained when a camera rotates 360° around a yaw axis, and an image obtained when the camera rotates 360° around a pitch axis.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Camera

FIG. 1 shows an active and an inactive camera associated with the mobile device 100, according to one embodiment. The mobile device 100 includes an outer casing 140 associated with the mobile device, a camera port 110 associated with the mobile device, and a camera 120 coupled to the camera port. The outer casing 140 includes a one or more surfaces, such as the six sides of a traditional iPhone, or an Android phone. The outer casing 140 can be a smooth curved surface comprising one side. The camera port 110 can be aligned with one or more of the plurality of surfaces associated with the outer casing 140, i.e., the camera can be placed anywhere on the mobile device, such as the top of the mobile device, the bottom of the mobile device, or any of the mobile device sides. The camera comprises at least one aperture 130. The aperture 130 can comprise various lenses ranging from an extremely long effective focal length lens, an extremely short effective focal length lens, a normal lens, etc. The camera 120 is operable to, when the camera is inactive, retract inside the camera port 110, and align with each surface in the plurality of surfaces associated with outer casing 140, so that the camera 120 becomes unnoticeable when inactive. The camera 120 is operable to, when the camera is active, protrude from the outer casing 140 associated with the mobile device, and position the aperture 130 to receive light mostly unobstructed by the mobile device.

According to another embodiment, the mobile device 100 comprises a front facing camera 150, or a back facing camera 160, in addition to the camera 120. There can be a plurality of front facing cameras such as the front facing camera 150, plurality of back facing cameras such as the back facing camera 160, and/or a plurality of the extended cameras such as the camera 120. The front facing camera 150 can be a camera integrated into the mobile device display, as described herein, or can be a traditional front facing camera.

According to one embodiment, the camera 120 moves linearly inside the camera port 110. The linear motion can be achieved using a linear guide, rack and pinion, a spring, etc. By placing the front facing camera inside the camera port, the display screen area can be increased to utilize the area traditionally associated with the camera in a mobile device 100 such as an Android phone, an iPhone, an iPad, etc.

According to another embodiment, the camera 120 can be a stand-alone camera, attached to the mobile device as an accessory.

Figure 2:
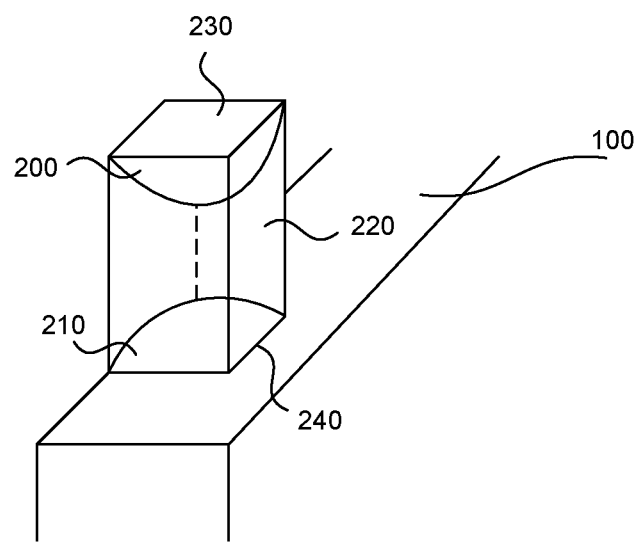
FIG. 2 shows an activated camera associated with the mobile device including a 360° lens, according to one embodiment.

FIG. 2 shows an activated camera associated with the mobile device 100 including a 360° lens, according to one embodiment. The lens can comprise a top lens 200, and a bottom lens 210, and transparent casing 220. The top lens 200 receives light beams beneath the plane 230. The bottom lens 210 receives light beams above the plane 240. According to another embodiment, the lens can comprise a single 360° lens. A light guide, by totally internally reflecting the received light, transmits the light received by the single 360° lens to the photo sensors associated with the camera 120. The light guide can also include additional lenses to focus the light before the lights reaches the photo sensors.

Figure 3A:
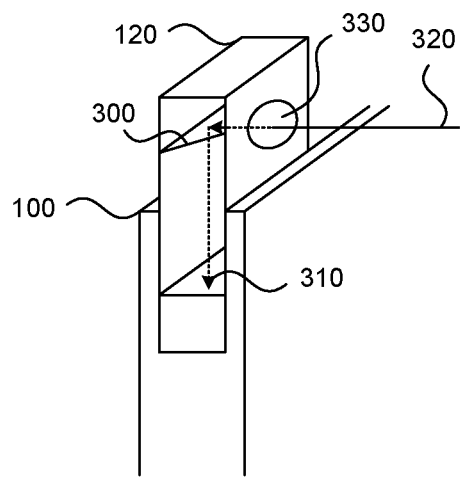
FIGS. 3A-B show a front and a back view of an active camera comprising a plurality of apertures, according to one embodiment.
Figure 3B:
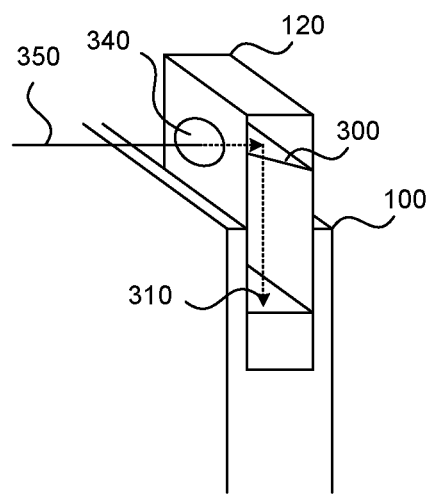

FIGS. 3A-B show a front and a back view of an active camera 120 comprising a plurality of apertures, according to one embodiment. The camera 120 associated with the mobile device 100 includes a first aperture 330, a second aperture 340, a plurality of photo sensors 310, and a light deflector 300 coupled to the first aperture 330, the second aperture 340, and the plurality of photo sensors 310. The first aperture 330 and/or the second aperture 340 can be lenses having any focal length, from extremely short effective focal length, to extremely long effective focal length. In one embodiment, the first and/or the second lens can have a 180° angle of view. The light deflector 300 can be an array of light deflectors including one or more light deflectors.

The light deflector 300 is operable to change a direction of a light beam 320, 350 by changing the light deflector's position. The change in the direction of the light beam 320, 350 can be from 0° to 180°. The light deflector 300 is operable to assume at least a first position, as shown in FIG. 3A, and a second position, as shown in FIG. 3B. The first position is operable to deflect a light beam 320 associated with the first aperture 330 to the photo sensors 310 associated with the camera 120, and the second position is operable to deflect the light beam 350 associated with the second aperture 340 to the photo sensors 310 associated with the camera 120. The light deflector 300 can be a mirror or a prism operable to reflect light. The mirror can be made out of any reflective material, such as glass, reflective plastic, metal, etc. The prism can be a Porro prism, Amici roof prism, pentaprism, etc. The light deflector 300 can be actuated by, or can be a part of a very small device, such as a micro-electromechanical systems ("MEMS") device, a nano-electromechanical systems ("NEMS") device, a pico-electromechanical systems device, etc.

In addition to the first and second apertures 330, 340, as described above, the camera 120 can include a third aperture, a fourth aperture, a fifth aperture, etc. Each aperture can correspond to a side of the camera 120. In addition to the first and second position, as described above, the light deflector 300 is operable to assume a third position, a fourth position, a fifth position, etc., where each light deflector position is configured to deflect a light beam associated with an aperture to the photo sensors 310 associated with the camera. Any one of the light deflector positions can deflect the light by 0°, i.e., the light deflector 300 lets the light beam through to the photo sensors 310.

According to one embodiment, the camera 120 can include a lens disposed between the plurality of photo sensors 310 and the light deflector 300. The lens can have an effective focal length between an extremely short effective focal length and an extremely long effective focal length. In another embodiment, the camera 120 can further include a light guide connecting the apertures 330, 340, the light deflector 300, and the plurality of photo sensors 310, where the light guide is operable to transmit a beam of light 320, 350 between the apertures 330, 340 and the lens. The light guide can be made of any material that totally internally reflects light. As described above, the apertures 330, 340 can also be various lenses.

According to another embodiment, the mobile device 100 can include a second camera, where the second camera is displaced a short distance from the camera 120. In various embodiments, the short distance between the two cameras roughly corresponds to the distance between a person's eyes, and in some cases mimics the distance between a person's eyes. In other embodiments, the short distance between the two cameras is reduced to almost zero, to minimize the space that the two cameras occupy on the mobile device 100. The second camera includes a second lens operable to capture a second image. The second image corresponds to a first image captured by the camera 120, where the second image and the first image comprise stereoscopic images. Stereoscopic images are two-dimensional images of the same scene, slightly offset, and corresponding to the left and the right eye of a viewer. When the two images are viewed by a person, the images give the impression of depth. The second camera can be a second extendable camera, can be a traditional cell phone camera, can be a cell phone camera integrated into the display, as described in this application, etc. The mobile device 100 includes a processor coupled to the second camera and the camera 120. The processor is operable to extract depth information based on the first image and the second image, to correct aberrations in each image, to rectify images, and to create stereoscopic images.

Figure 4:
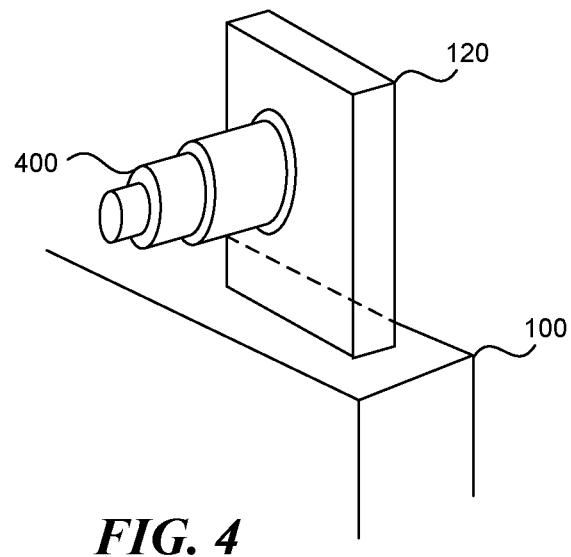
FIG. 4 shows a folded optical zoom lens associated with the camera, according to one embodiment.

FIG. 4 shows a folded optical zoom lens associated with the camera 120, according to one embodiment. The optical zoom lens 400 can be extended when the camera 120 is active, or can be completely retracted to fit inside the camera port, when the camera 120 is inactive. Various lenses disclosed in the current application can also include a folded optical zoom lens.

According to another embodiment, the camera 120 can be an articulated fiber optic camera, wherein the articulated fiber optic camera is operable to be steered 360°. The lens associated with a fiber optic camera can have an effective focal length from an extremely short effective focal length to an extremely long effective focal length.

In another embodiment, the various cameras disclosed herein further comprise a flash, such as a light emitting diode ("LED") flash.

Figure 5:
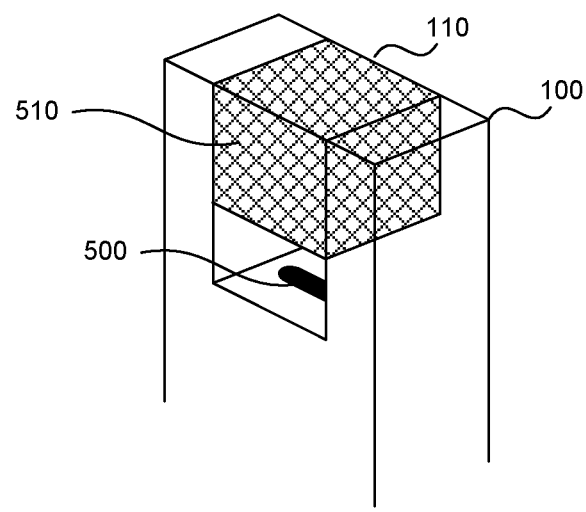
FIG. 5 shows the camera port comprising additional accessories associated with the mobile device, according to one embodiment.

FIG. 5 shows the camera port 110 comprising additional accessories 500 associated with the mobile device, according to one embodiment. Element 510 is the camera 120 retracted into the camera port 110. The camera port 110, in addition can include a subscriber identity module ("SIM") card, or a memory card, such as Secure Digital ("SD") card. By combining additional accessories 500 into the camera port 110, the number of ports associated with the mobile device 100 are reduced, thus reducing the cost of manufacturing the mobile device 100, and reducing the risk of foreign substances, such as water or dust, contaminating the mobile device electronic circuitry.

In many of the embodiments disclosed here, the camera 120, 510 can be removable whether the camera is active or inactive. The mobile device 100 is operable to close off the camera port 110, so that the mobile device 100 appears as if the camera 120 is inactive.

The camera 120 disclosed here can be activated in a variety of ways such as via a software associated with the mobile device, a dedicated button associated with the mobile device, a voice activation, a gesture, or a power button associated with the mobile device. The gesture can be a motion associated with the whole mobile device, such as a quick motion downwards, a shake of the mobile device, a tilting of the mobile device, etc. The gesture can also be associated with the display screen of the mobile device, such as a swipe upwards, a selection of a camera icon, etc. The power button can be configured to serve a dual purpose, namely, to power off the phone, and to toggle the camera between active and inactive state. For example, the power button can turn the phone off when the power button receives long-press as input, and the power button can toggle the states of the camera between active and inactive, when the power button receives a short-press as input.

Figure 6:
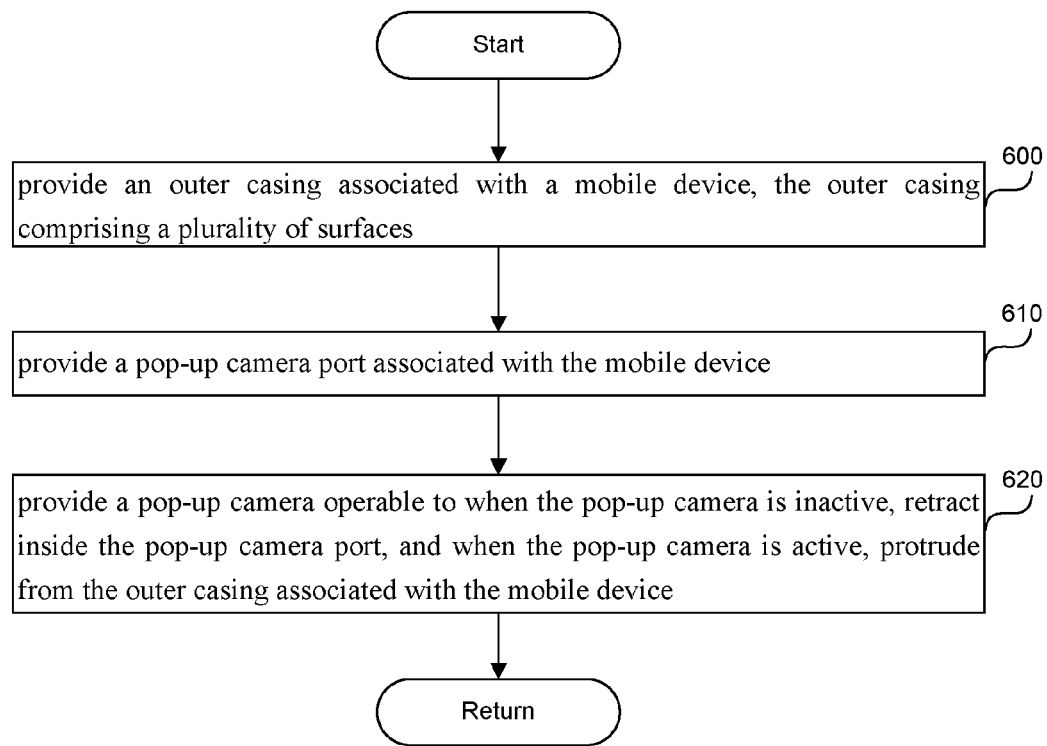
FIG. 6 is a flowchart of a method to provide a camera, associated with the mobile device 100, according to one embodiment.

FIG. 6 is a flowchart of a method to provide a camera 120, associated with the mobile device 100, according to one embodiment. In step 600, an outer casing 140 associated with the mobile device 100 is provided, where the outer casing includes a plurality of surfaces. In step 610, a camera port 110 associated with the mobile device 100 is provided. In step 620, the camera 120 is coupled to the camera port 110. The camera 120 comprises an aperture 130. When the camera 120 is inactive, the camera 120 retracts inside the camera port 110, and aligns with each surface in the plurality of surfaces associated with the outer casing 140. When the camera 120 is active, the camera 120 protrudes from the outer casing 140 associated with the mobile device 100, and positions the aperture 130 to receive light unobstructed by the mobile device 100. In various embodiments, additional method steps can be performed to enable the creation of the embodiments described above.

Camera Integrated into the Display

Figure 7A:
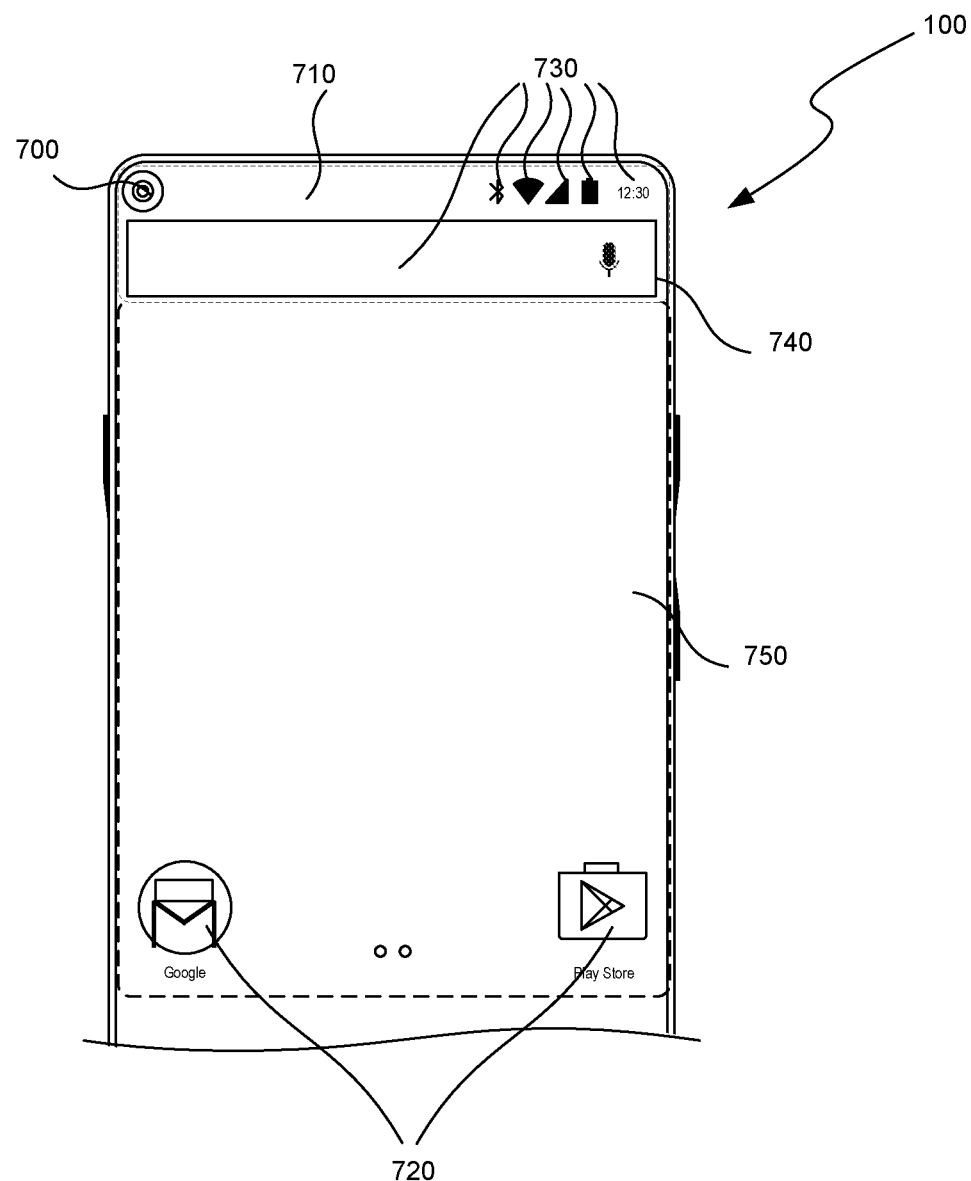
FIG. 7A shows a front facing camera integrated into the display screen associated with the mobile device, according to one embodiment.

FIG. 7A shows a front facing camera 700 integrated into the display screen 710 associated with the mobile device 100, according to one embodiment. The display screen 710 associated with the mobile device 100 comprises a plurality of icons corresponding to: a plurality of mobile device software applications 720, and a plurality of mobile device operating system functions 730. The camera 700, coupled to the mobile device 100, occupies a portion of the display screen 710. The display screen 710 can occupy the whole outer surface of the device 100, or can occupy one whole side of the device 100, as shown in FIG. 7. The portion of the display screen occupied by the camera is operable to act as a camera icon in the plurality of icons, so that the camera 700 is activated when the camera icon 700 is selected. The camera icon 700 can be placed in a portion of the display screen 740 reserved for the mobile device operating system functions, or can be placed in a portion of the display screen 750 associated with the mobile device software applications. The camera icon 700 can be selected by touch, or can be voice activated. When the camera icon 700 is selected, the camera icon 700 can be operable to perform a variety of functions, such as launching a camera application on the mobile device, taking a picture, etc. By integrating the camera 700 into the display, the area of the display screen is increased because the camera acts as both a camera operable to record an image, and a camera icon operable to activate the camera.

According to another embodiment, the camera can be an articulated fiber optic camera, wherein the articulated fiber optic camera is operable to be steered in a plurality of directions. The outer casing associated with the mobile device can have a plurality of openings such as a front facing, back facing, left facing, right facing, or top facing opening. The fiber optic camera can be steered to receive light beams through any of the plurality of openings associated with the outer casing. In one embodiment, the fiber optic camera can be a front facing, a back facing, a left facing, a right facing, or a top facing camera. The lens associated with a fiber optic camera can have a focal length from an extremely short effective focal length to an extremely long effective focal length.

Figure 7B:
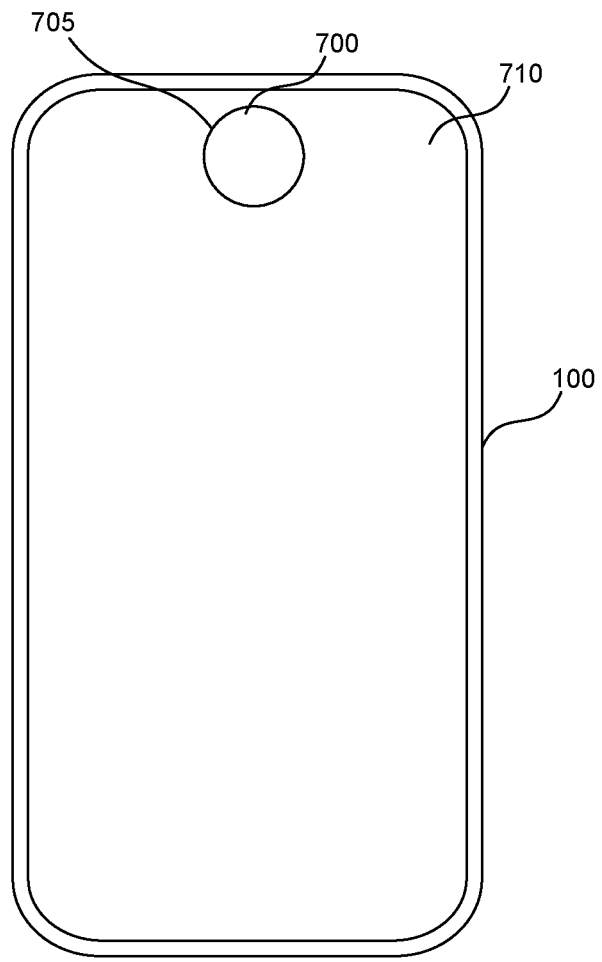
FIG. 7B shows a front facing camera integrated into the display screen associated with the mobile device, according to another embodiment.

FIG. 7B shows a front facing camera 700 integrated into the display screen 710 associated with the mobile device 100, according to another embodiment. In various embodiments disclosed herein, the mobile device 100 can take on various shapes such as a cuboid shape, a cuboid shape with rounded edges, an ellipsoid, a curved close surface, etc. Regardless of the shape, the mobile device 100 includes an outer surface. In various embodiments disclosed herein, the display screen 710 occupies substantially the whole outer surface associated with the mobile device 100. When the mobile device shape includes a plurality of sides, such as when the mobile device 100 is shaped as a cuboid, or a cuboid with rounded edges, and the display screen 710 is associated with one or more sides in the plurality of sides, the display screen 710 occupies substantially all the sides with which of the display screen 710 is associated.

In various embodiments disclosed herein, the camera 700 can be placed anywhere on the display screen 710, such as the upper right corner, the lower left corner, middle of the screen, middle of the upper edge associated with the display screen, etc.

In one embodiment, the border 705 between the camera 700 and the display screen 710 is perimeter associated with the camera 700. The camera 700 and border 705 can take on various shapes such as a circle, a rectangle, a square, an ellipse, a curved shape, an open curved line, etc.

Figure 7C:
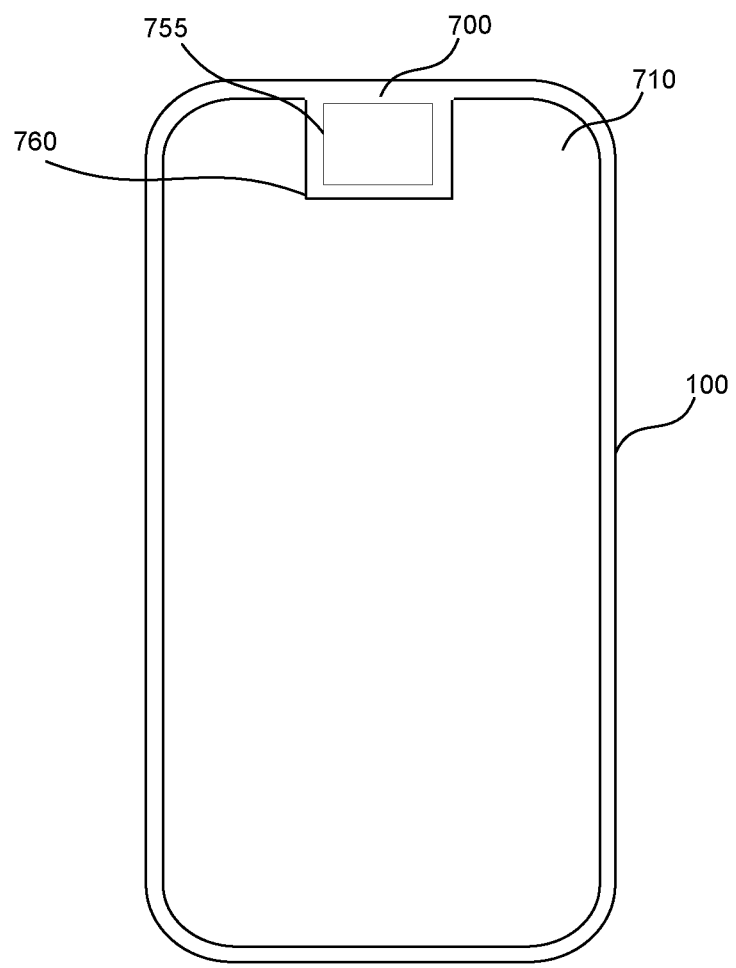
FIGS. 7C-7E show borders between the camera 700, and the display screen 710, according to various embodiments.
Figure 7D:
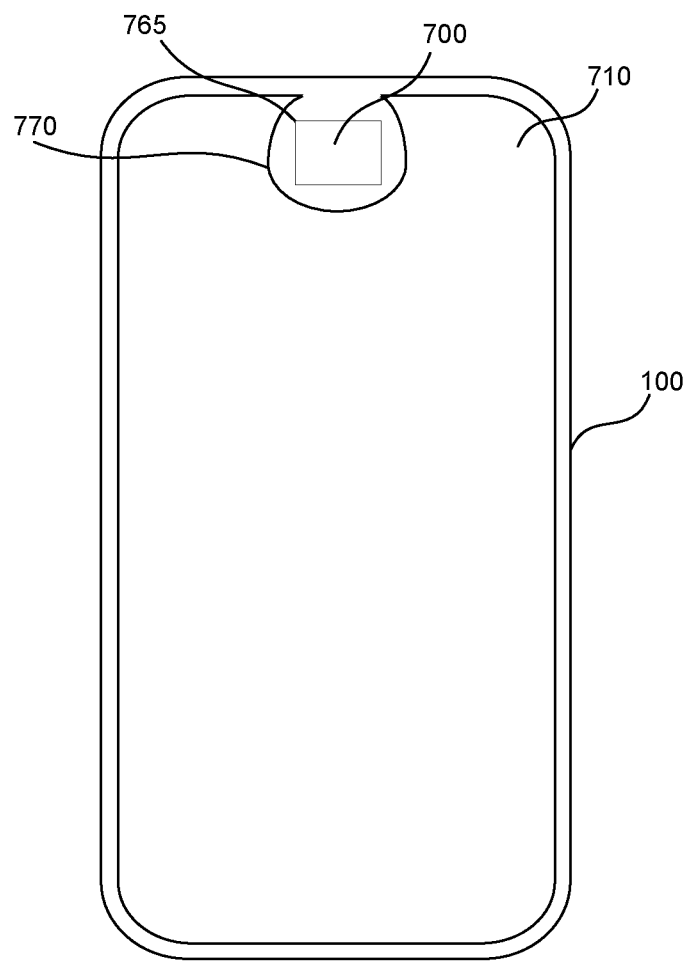
Figure 7E:
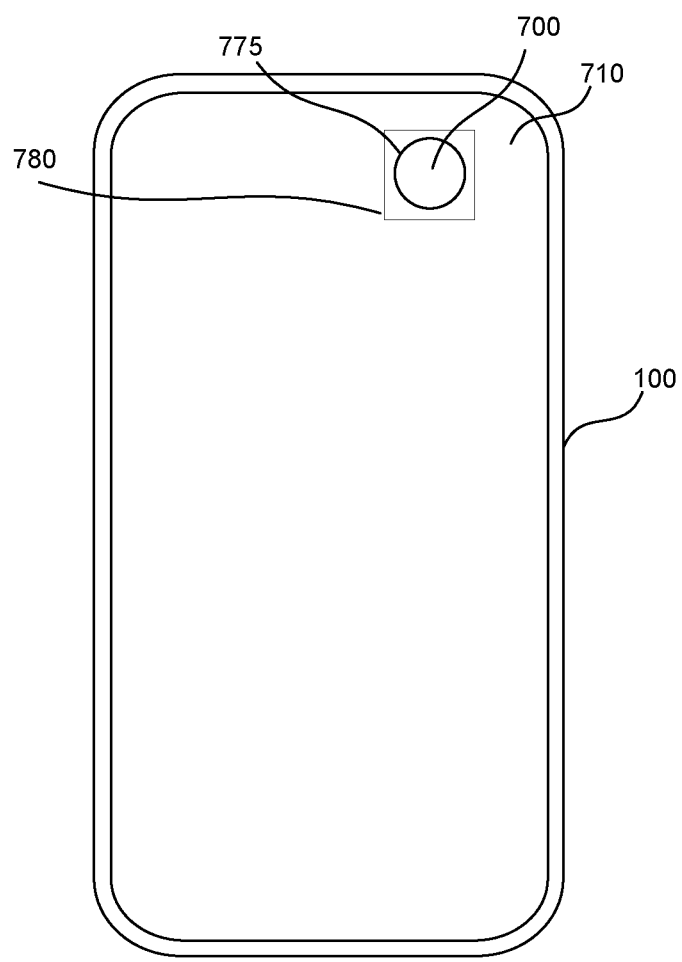

FIGS. 7C-7E show borders between the camera 700, and the display screen 710, according to various embodiments. In various embodiments disclosed herein, the camera 700, the perimeter 705, 755, 765, 775 associated with the camera 710, and the border 705, 760, 770, 780 between the camera 700 and the display screen 710 can take on various shapes such as a circle, a rectangle, a square, an ellipse, a curved shape, an open curved line, etc. The shapes of the perimeter 755, 765, 775 and the border 760, 770, 780 can have parallel lines, but do not necessarily have to have parallel lines. FIGS. 7D-7E show an example where the perimeter 765, 775 and the border 770, 780 do not have parallel lines. For example, FIG. 7D shows the border 770 having a shape of an open curved line, while the perimeter 765 associated with the camera 700 has a rectangular shape. Similarly, FIG. 7E shows the border 780 having a square shape, while the perimeter 775 associate with the camera 700 has a circular shape. FIG. 7C shows an example where the perimeter 755 and the border 760 do have parallel lines.

Further, the border 760, 770, 780 between the camera 700 and the display screen 710 can enclose the perimeter 755, 765, 775 associated with the camera 710 to various degrees. FIGS. 7C-7D show the border 760, 770 partially enclosing the perimeter 755, 765. For example, in FIG. 7C the border 760 encloses the perimeter 755 on three sides. In FIG. 7D, the border 770 partially encloses the perimeter 765 on more than three sides, however the border 770 does not fully enclose the perimeter 765. FIG. 7E shows the border 780 fully enclosing the perimeter 775.

Figure 8:
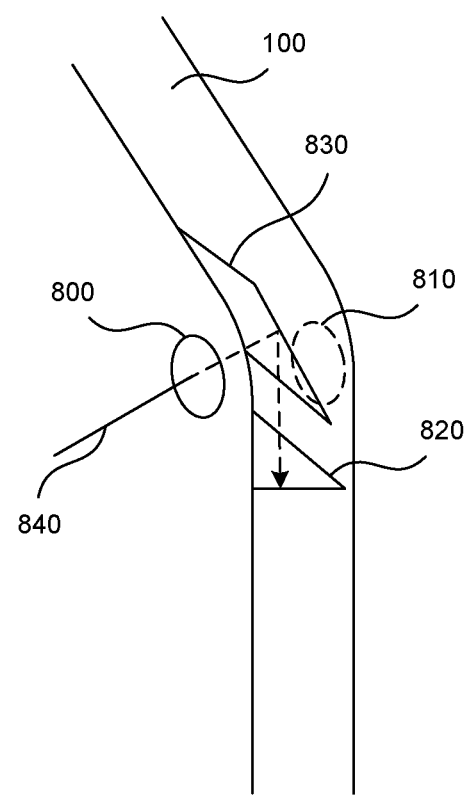
FIG. 8 shows a camera integrated into the display, according to one embodiment.

FIG. 8 shows a camera 700 integrated into the display, according to one embodiment. The camera comprises a front aperture 800 occupying the portion of the display screen, a back aperture 810 disposed in a direction opposite of the front aperture 800, a plurality of photo sensors 820, and a light deflector 830 coupled to the front aperture 800, the back aperture 810, and the plurality of photo sensors 820. The front aperture 800 and/or the back aperture 810 can comprise lenses that can have any effective focal length, from extremely short effective focal length, to extremely long effective focal length. In one embodiment, the front and/or the back lens can have a 180° angle of view. In one embodiment, the front and/or the back lens can be a folded optical zoom lens, as depicted in FIG. 4.

The light deflector 830 is operable to change a direction of a light beam 840 by changing the light deflector's position. The change in the direction of the light beam 840 can be from 0° to 180°. The light deflector 830 can assume a first position, and a second position, where the first position is configured to deflect a light beam associated with the front aperture 800 to the photo sensors 820. The second position is configured to deflect the light beam associated with the back aperture 810 to the photo sensors associated with the camera.

The light deflector 830 can be a mirror or a prism operable to reflect light. The mirror can be made out of any reflective material, such as glass, reflective plastic, metal, etc. The prism can be a Porro prism, Amici roof prism, pentaprism, etc. The light deflector can be actuated by, or a part of a very small device, such as a micro-electromechanical systems ("MEMS") device, a nano-electromechanical systems ("NEMS") device, a pico-electromechanical systems device, etc.

According to one embodiment, the camera can include a lens disposed between the plurality of photo sensors 820 and the light deflector 830. The lens can have any effective focal length between an extremely short effective focal length and an extremely long effective focal length. In another embodiment, the camera can further include a light guide connecting the apertures 800, 810, the light deflector 830, and the plurality of photo sensors 820, where the light guide is operable to transmit a beam of light 840 between the apertures 800, 810 and the lens. The light guide can be made of any material that totally internally reflects light. As described above, the apertures 800, 810 can also include various lenses.

In various embodiments disclosed herein there can be a plurality of front facing cameras such as the camera 700. According to one embodiment, the mobile device 100 can include a second camera, where the second camera is displaced a short distance from the camera 700. In various embodiments, the short distance between the two cameras roughly corresponds to the distance between a person's eyes, and in some cases mimics the distance between a person's eyes. In other embodiments, the short distance between the two cameras is reduced to almost zero, to minimize the space that the two cameras occupy on the mobile device 100. The second camera includes a second lens operable to capture a second image. The second image corresponds to a first image captured by the camera 700, where the second image and the first image comprise stereoscopic images. The second camera can be a second extendable camera as described herein, can be a traditional cell phone camera, can be a cell phone camera integrated into the display as described herein, etc. The mobile device 100 includes a processor coupled to the second camera and the camera 120. The processor is operable to extract depth information based on the first image and the second image, to correct aberrations in each image, to rectify images, and to create stereoscopic images.

Figure 9:
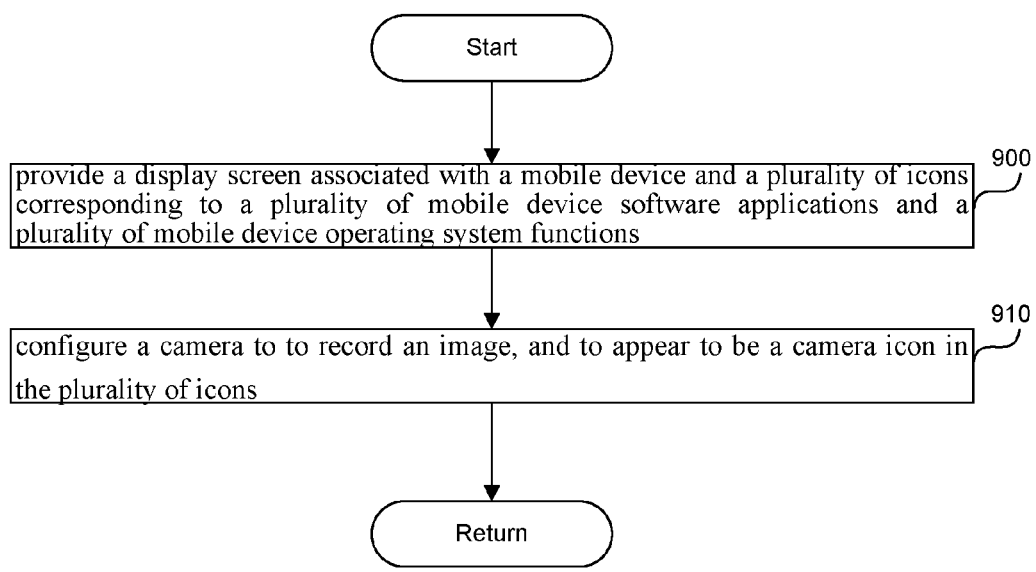
FIG. 9 is a flowchart of a method to integrate a camera into the display screen, according to one embodiment.

FIG. 9 is a flowchart of a method to integrate a camera into the display screen, according to one embodiment. In step 900, a display screen associated with the mobile device 100 is provided, such that the display screen includes a plurality of icons. The plurality of icons corresponds to a plurality of mobile device software applications and a plurality of mobile device operating system functions. In step 910, the camera is configured to record an image, and to appear to be a camera icon in the plurality of icons. The camera icon is configured to activate the camera when the camera icon is selected. The camera can be selected by touch, or can be voice activated. The camera can be a fiber optic camera. In various embodiments, additional method steps can be performed to enable the creation of the embodiments described above.

360° Camera

Figure 10B:
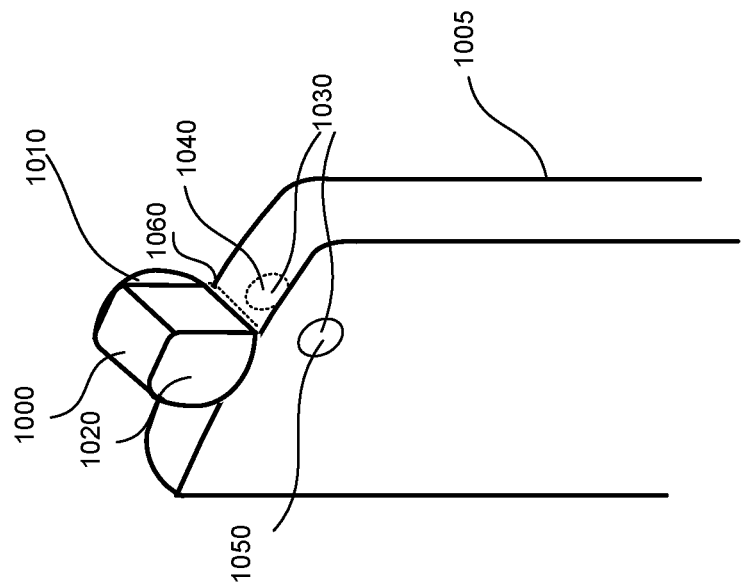
FIGS. 10A-10B show an imaging device capable of recording an undistorted full view of a surrounding environment, according to one embodiment.
Figure 10A:
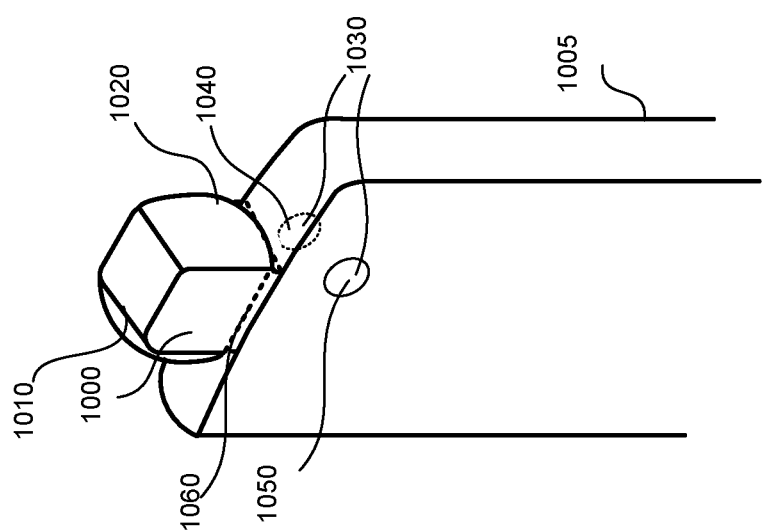

FIGS. 10A-10B show an imaging device capable of recording an undistorted 360° view of a surrounding environment, according to one embodiment. In various embodiments, the 360° view includes 360° view around all 3-dimensional axes, X, Y, Z. The imaging device includes a first plurality of cameras 1000, and a second plurality of cameras 1030.

The first plurality of cameras 1000 includes a plurality of wide angle lenses 1010, 1020, such as fisheye lenses. The plurality of wide angle lenses 1010, 1020 can be evenly distributed around the first plurality of cameras 1000. For example, if the plurality of wide angle lenses 1010 comprises two lenses, the two lenses are disposed on opposite sides of the camera. The first plurality of cameras 1000 is configured to record a first plurality of images associated with the surrounding environment. Each image in the first plurality of images comprises an image periphery distorted by a wide angle lens in the plurality of wide angle lenses, and an image center undistorted by the wide angle lens.

The second plurality of cameras 1030 includes a plurality of lenses 1040, 1050. The plurality of lenses 1040, 1050 can be evenly distributed around the second plurality of cameras 1030. The plurality of lenses 1040, 1050 can be distributed to the left and right of the first plurality of cameras 1000, and/or to the top and bottom of the first plurality of cameras 1000, etc. The plurality of lenses 1040, 1050 can be any kind of lens from an extremely short effective focal length lens to an extremely long effective focal length lens, for example a normal lens. The second plurality of cameras 1030 is configured to record a second plurality of images associated with the surrounding environment. Each image in the second plurality of images comprises an image center undistorted by a camera in the second plurality of cameras, wherein the plurality of image centers associated with the second plurality of images overlaps the plurality of image peripheries associated with the first plurality of images.

In one embodiment, the imaging device includes a swivel 1060 configured to rotate the first plurality of cameras 1000 and/or the second plurality of cameras 1030. The swivel 1060 can rotate around one, two, or all three of the 3-dimensional axes. The first plurality of cameras 1000 and the second plurality of cameras 1030 can rotate with respect to each other, or can rotate with respect to the device on which the first and the second plurality of cameras are mounted. FIG. 10B shows a position in which the first plurality of cameras 1000 is rotated with respect to the second plurality of cameras 1030, relative to the position shown in FIG. 10A. The swivel 1060 can be connected to a motor which automatically rotates the swivel 1060. The motor can be a micro-electromechanical systems ("MEMS") device, a nano-electromechanical systems ("NEMS") device, a pico-electromechanical systems device, etc. the motor can be connected to a processor associated with the imaging device, a processor associated with the mobile device 1005. In one embodiment, after a first picture is recorded, the motor rotates the swivel 1060 anywhere from 0° to 90°, and the cameras 1000, 1030, record a second picture. In addition, the swivel 1060 can include a lock mechanism so that when the swivel 1060 rotates the cameras 1000 and/or 1030 to a desired position, the lock mechanism engages to keep the cameras 1000 and/or 1030 in place.

The first plurality of cameras 1000 and the second plurality of cameras 1030 can record the first plurality of images and the second plurality of images synchronously, or asynchronously. The imaging device can include a processor configured to combine the first plurality of images and the second plurality of images into an image undistorted by the plurality of wide angle lenses. The processor can also be associated with the mobile device 1005.

The imaging device disclosed herein can be a stand-alone device, can be a mobile device 1005 accessory, or can be integrated into the mobile device 1005. Further, the first plurality of cameras 1000 and/or the second plurality of cameras 1030 can be a standalone device, can be a mobile device 1005 accessory, or can be integrated into the mobile device 1005 such as a camera 120 in FIGS. 1-5, and/or camera 700 in FIGS. 7A-7E, 8. The mobile device 1005 accessory can connect to the phone via a USB port or wirelessly. When the first plurality of cameras 1000 and/or the second plurality of cameras 1030 are coupled to the mobile device 1005, the cameras 1000, 1030 can be powered by the mobile device 1005, and be communicatively coupled to the processor associated with the mobile device 1005, so that the images recorded by the cameras 1000, 1030 are stored on the mobile device 1005. Alternatively, the images recorded by the cameras 1000, 1030 can be stored in the cameras 1000, 1030 and sent to the mobile device 1005 for processing and/or for display.

Figure 11A:
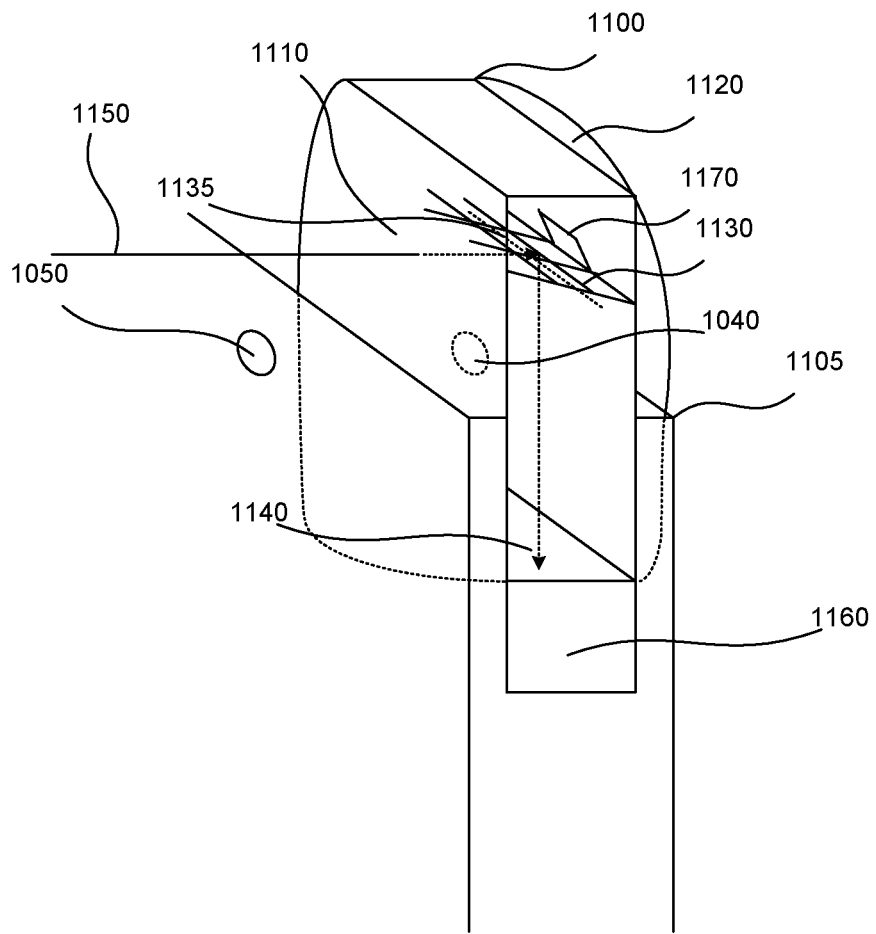
FIG. 11A shows a side view of a partially activated plurality of cameras, according to one embodiment.

FIG. 11A shows a side view of a partially activated plurality of cameras, according to one embodiment. The first plurality of cameras 1100 associated with the mobile device 1105 includes a first wide angle lens 1110, and a second wide angle lens 1120, a plurality of photo sensors 1140, and an array of light deflectors 1130 coupled to the first wide angle lens 1110, the second wide angle lens 1120, and the plurality of photo sensors 1140. The lenses 1110, 1120 can be fisheye lenses. The array of light deflectors 1130 can include one or more light deflectors. The second plurality of cameras includes cameras 1050, 1040 associated with the mobile device 1105.

The first plurality of cameras 1100 is operable to, when the first plurality of cameras 1100 is inactive, retract inside a camera port 1160 associated with the mobile device 1105, and align with one or more surfaces associated with an outer casing associated with the mobile device 1105, so that the first plurality of cameras 1100 becomes unnoticeable when inactive. The first plurality of cameras 1100 is operable to, when the camera is active, protrude from the outer casing associated with the mobile device 1105, and position the lenses 1110, 1120 to receive light mostly unobstructed by the mobile device 1105.

The array of light deflectors 1130 is operable to change a direction of a light beam 1150 by changing the position associated with the array of light deflectors 1130. The change in the direction of the light beam 1150 can be from 0° to 180°. Each light deflector in the array of light deflectors 1130 is operable to rotate around an axis 1135 associated with the individual light deflector, and to assume at least two positions. The first position is operable to deflect a light beam 1150 associated with the first lens 1110 to the photo sensors 1140 associated with the first plurality of cameras 1100. The second position is operable to deflect the light beam associated with the second lens 1120 to the photo sensors 1140 associated with the first plurality of cameras 1100. Each of the light deflectors in the array of light deflectors 1130 can rotate independently of each other, or they can rotates in unison. Each of the light deflectors in the array of light deflectors 1130 can assume a position different from each other, they can assume the same position, or they can assume a position such that the array of light deflectors 1130 creates a smooth surface, such as a plane, or a curved surface. For example, the light deflector 1170 has assumed a position different from the rest of the light deflectors in the array of light deflectors 1130, thus creating a non-smooth surface.

Each of the light deflectors in the array of light deflectors 1130 can be a mirror or a prism operable to reflect light. The array of light deflectors 1130 can comprise a mixture of mirror light deflectors and prism light deflectors, or can comprise only mirror light deflectors, or only prism light deflectors. The mirror can be made out of any reflective material, such as glass, reflective plastic, metal, etc. The prism can be a Porro prism, Amici roof prism, pentaprism, etc. The array of light deflectors 1130 can be actuated by, or can be a part of a very small device, such as a micro-electromechanical systems ("MEMS") device, a nano-electromechanical systems ("NEMS") device, a pico-electromechanical systems device, etc.

In addition to the first and second lenses 1110, 1120, as described above, the first plurality of cameras 1100 can include a third lens, a fourth lens, and a fifth lens. Each lens can correspond to a side of the first plurality of cameras 1100. In addition to the first and second position, as described above, the array of light deflectors 1130 is operable to assume a third position, a fourth position, a fifth position, etc., where each position associated with array of light deflectors 1130 is configured to deflect a light beam associated with a lens to the photo sensors 1140 associated with the first plurality of cameras 1100. Any one of the positions associated with a light deflector in the array of light deflectors 1130 can deflect the light by 0°, i.e., the array of light deflectors 1130 lets the light beam through to the photo sensors 1140.

According to one embodiment, the first plurality of cameras 1100 can include a lens disposed between the plurality of photo sensors 1140 and the array of light deflectors 1130. The lens can have an effective focal length between an extremely short effective focal length and an extremely long effective focal length. In another embodiment, the first plurality of cameras 1100 can further include a light guide connecting the lenses 1110, 1120, the array of light deflectors 1130, and the plurality of photo sensors 1140, where the light guide is operable to transmit the light beam 1150 between the lenses 1110, 1120 and the lens. The light guide can be made of any material that totally internally reflects light.

According to another embodiment, the mobile device 1105 can include a second camera, where the second camera is displaced a short distance from the first plurality of cameras 1100. In various embodiments, the short distance between the two cameras roughly corresponds to the distance between a person's eyes, and in some cases mimics the distance between a person's eyes. In other embodiments, the short distance between the two cameras is reduced to almost zero, to minimize the space that the two cameras occupy on the mobile device 1105. The second camera includes a second lens operable to capture a second image. The second image corresponds to a first image captured by the first plurality of cameras 1100, where the second image and the first image comprise stereoscopic images. Stereoscopic images are two-dimensional images of the same scene, slightly offset, and corresponding to the left and the right eye of a viewer. When the two images are viewed by a person, the images give the impression of depth. The second camera can be a second extendable camera, can be a traditional cell phone camera, can be a cell phone camera integrated into the display, as described in this application, etc. The mobile device 1105 includes a processor coupled to the second camera and the first plurality of cameras 1100. The processor is operable to extract depth information based on the first image and the second image, to correct aberrations in each image, to rectify images, and to create stereoscopic images.

Figure 11B:
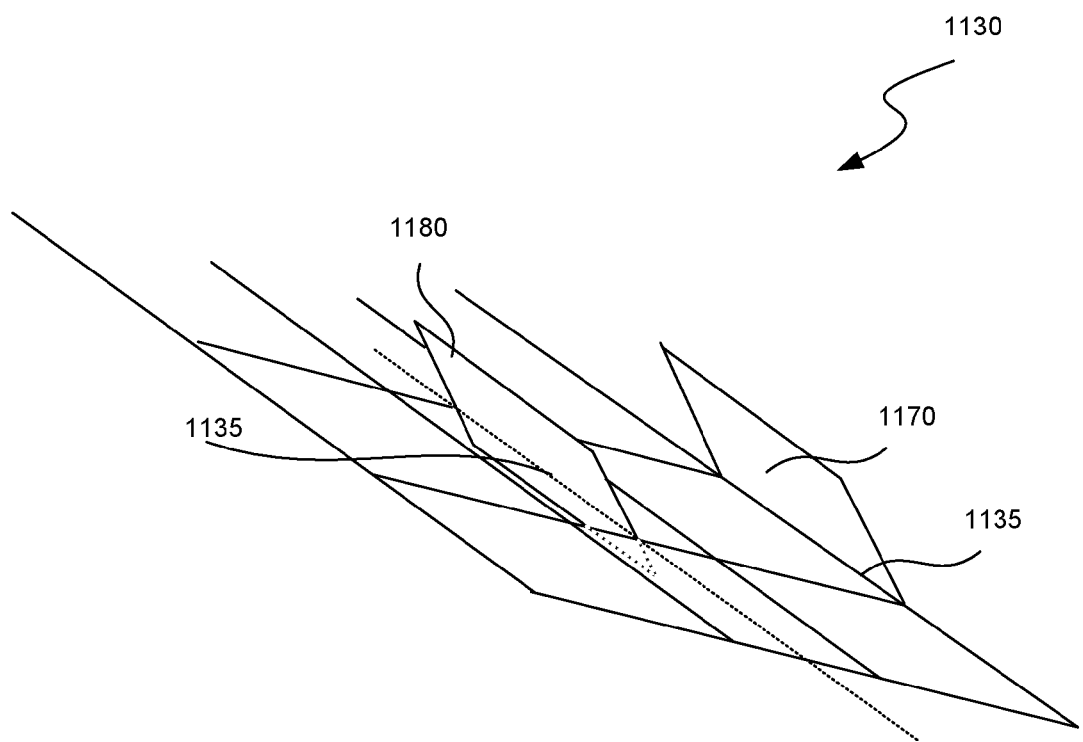
FIG. 11B shows the array of light deflectors 1130, according to one embodiment.

FIG. 11B shows the array of light deflectors 1130, according to one embodiment. The axis 1135 associated with a light deflector in the array of light deflectors 1130 can be positioned anywhere on the light deflector. For example the axis 1135 can be an axis of symmetry associated with the light deflector, or can align with any of the edges associated with a light deflector in the array of light deflectors 1130. For example, the axis of rotation 1135 associated with the light deflector 1170 is aligned with an edge associated with the light deflector 1170. The axis of rotation 1135 associated with the light deflector 1180 is aligned with an axis of symmetry associated with the light deflector, such as a horizontal axis of symmetry, as shown in FIG. 11B. The light deflectors 1170, 1180 can rotate independently of the remainder of the light deflectors, as shown in FIG. 11B.

Figure 12A:
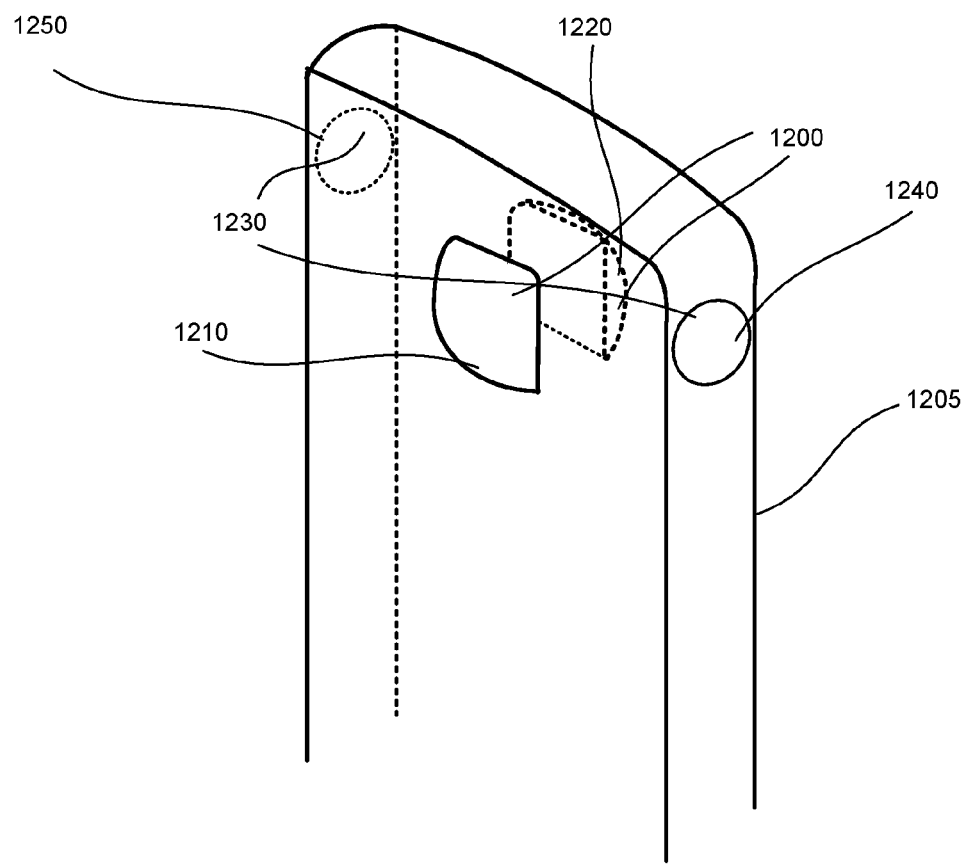
FIG. 12A shows the first plurality of cameras, and the second plurality of cameras integrated into a mobile device, according to one embodiment.

FIG. 12A shows the first plurality of cameras, and the second plurality of cameras integrated into a mobile device, according to one embodiment. The first plurality of cameras 1200 comprises two wide angle lenses 1210, and 1220. The second plurality of cameras 1230 comprises two lenses 1240, and 1250. The second plurality of cameras 1230 is disposed to record images in the region where the wide angle lenses 1210, and 1220 produce distorted images. For example, the second plurality of cameras 1230 is disposed at 90° angles with respect to the first plurality of cameras 1200, as shown in FIG. 12A. Both the first plurality of cameras 1200 and the second plurality of cameras 1230 are integrated into the mobile device. The first plurality of cameras 1200 comprises a front facing and a back facing camera associated with the mobile device 1205. The second plurality of cameras 1230 comprises side facing cameras, such as a left facing and a right facing camera.

The mobile device 1205 can comprise one or more sides. For example, the mobile device 1205 can have 6 sides, such as a standard iPhone, or an android phone, or the mobile device 1205 can be curved, for example an ellipsoid, comprising only a single side.

FIG. 12B is a stand-alone imaging device, according to one embodiment. The stand-alone imaging device comprises six sides. Two wide angle lenses 1260 are mounted on opposite sides associated with the imaging device. Four normal lenses 1270, 1272, 1274, 1276 are disposed in the middle of the remaining four sides associated with the imaging device. For edges 1290, separating sides which have normal lenses mounted on them, are equipped with a mounting mechanism, such as a rail, to accept a stand configured to support the imaging device. The stand can be an elongated selfie stick, a tripod, etc. For example, in FIG. 12B, two elongated stands 1280 are attached to edges 1290 associated with imaging device, such that the two sides comprising the edge have the normal lenses mounted on them. The angle between the stands 1280 and the edges 1290 is between 130° and 145°, so that a view of normal lenses 1270, 1274, 1276 is not blocked.

FIGS. 12C-12D show an imaging device configured to be a mobile device accessory, according to another embodiment. The stand-alone imaging device 1215 includes two sides. One wide angle lens 1225 is disposed on one side associated with imaging device 1215, while a normal lens 1235 is disposed on the other side associated with imaging device 1215. The imaging device 1225 can be mounted on a back side associated with the mobile device 1205, as shown in FIG. 12D. Elements 1245 is a front camera associated with the mobile device 1205.

Figure 13:
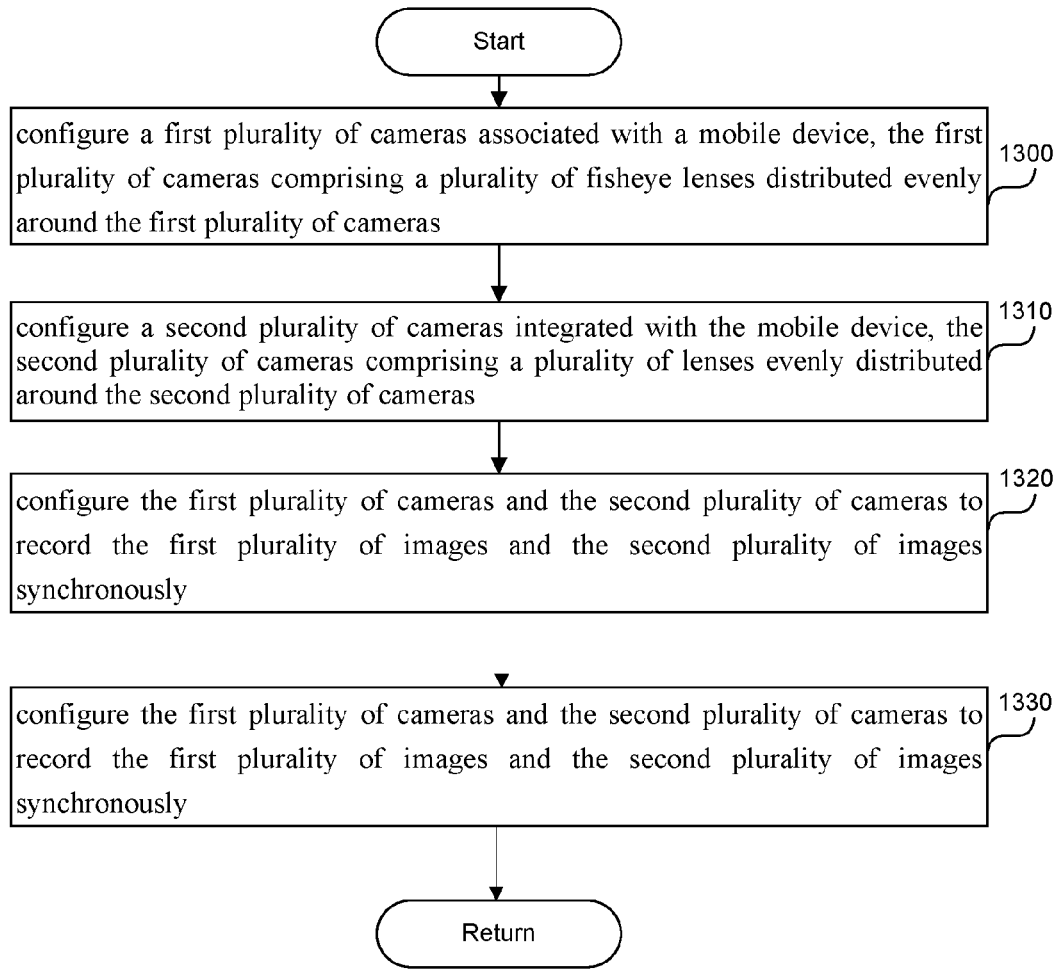
FIG. 13 is a flowchart of a process to record an undistorted 360° view of a surrounding environment, according to one embodiment.

FIG. 13 is a flowchart of a process to record an undistorted 360° view of a surrounding environment, according to one embodiment. In step 1300, a first plurality of cameras associated with a mobile device is configured. The first plurality of cameras includes a plurality of fisheye lenses distributed evenly around the first plurality of cameras. The first plurality of cameras is configured to record a first plurality of images associated with the surrounding environment. Each image in the first plurality of images comprises an image periphery distorted by a fisheye lens in the plurality of fisheye lenses, and an image center undistorted by the fisheye lens.

In step 1310, a second plurality of cameras integrated with the mobile device is configured. The second plurality of cameras includes a plurality of lenses evenly distributed around the second plurality of cameras. The second plurality of cameras is configured to record a second plurality of images associated with the surrounding environment. Each image in the second plurality of images comprises an image center undistorted by a camera in the second plurality of cameras. The plurality of image centers associated with the second plurality of images overlaps the plurality of image peripheries associated with the first plurality of images.

In step 1320, the first plurality of cameras and the second plurality of cameras are configured to record the first plurality of images and the second plurality of images synchronously.

In step 1330, a processor is configured to combine the first plurality of images and the second plurality of images into an image undistorted by the plurality of fisheye lenses.

Figure 14A:
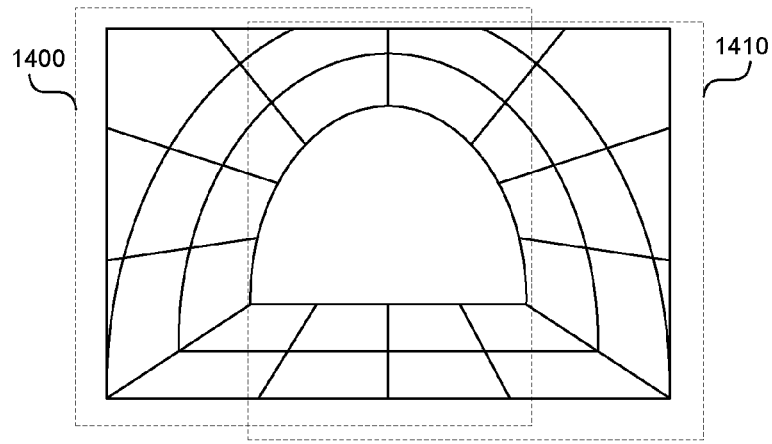
FIG. 14A shows an image recorded by a normal lens associated with a second plurality of cameras, according to one embodiment.

FIG. 14A shows an image recorded by a normal lens associated with a second plurality of cameras, according to one embodiment. The image is that of a cobblestone tunnel. The image is undistorted, and shows the environment as a human eye would perceive the environment. The area of the image 1400 overlaps with an image recorded by a wide angle lens in the first plurality of cameras, where the wide angle lens is disposed to the left of the normal lens. The area of the image 1410 overlaps with an image recorded by a wide angle lens in the second plurality of cameras, where the wide angle lens is disposed to the right of the normal lens.

Figure 14B:
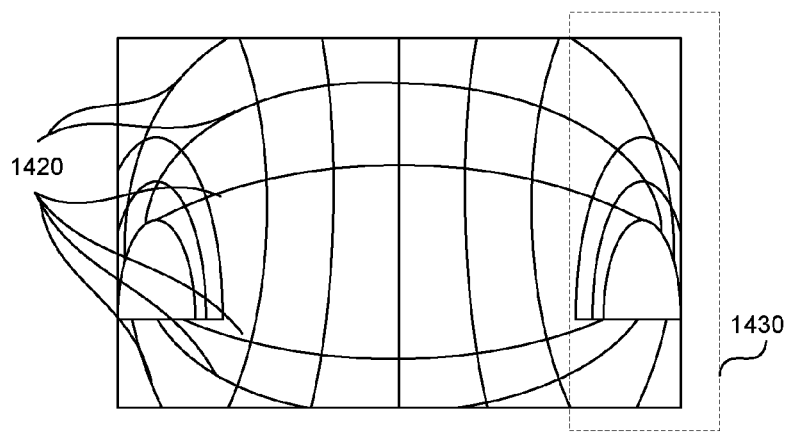
FIG. 14B shows an image recorded by a wide angle lens associated with the first plurality of cameras, according to one embodiment.

FIG. 14B shows an image recorded by a wide angle lens associated with the first plurality of cameras, according to one embodiment. The wide angle lens is disposed at 90° with respect to the normal lens from FIG. 14A. Otherwise, the position and orientation of the wide angle lens is the same as the position orientation of the normal lens in FIG. 14A. The image is distorted because straight lines are depicted as curved lines 1420. Area of the image 1430 overlaps with the area of the image 1400 in FIG. 14A.

Figure 14C:
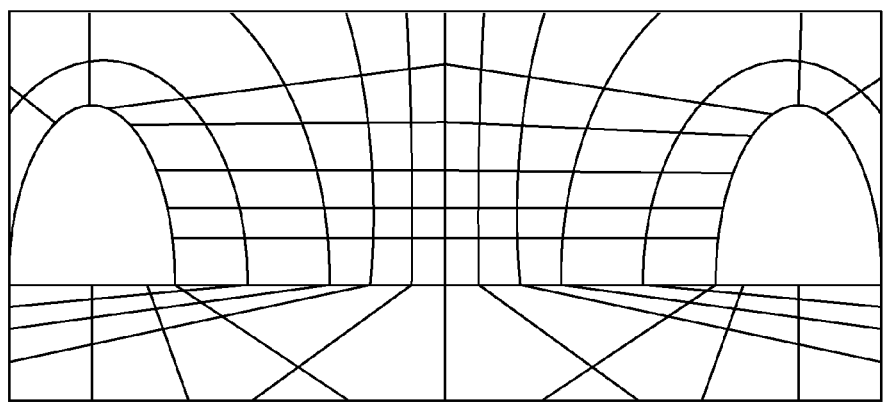
FIG. 14C shows an undistorted image obtained by combining images associated with the first plurality of cameras and images associated with the second plurality of cameras, according to one embodiment.
Figure 15:
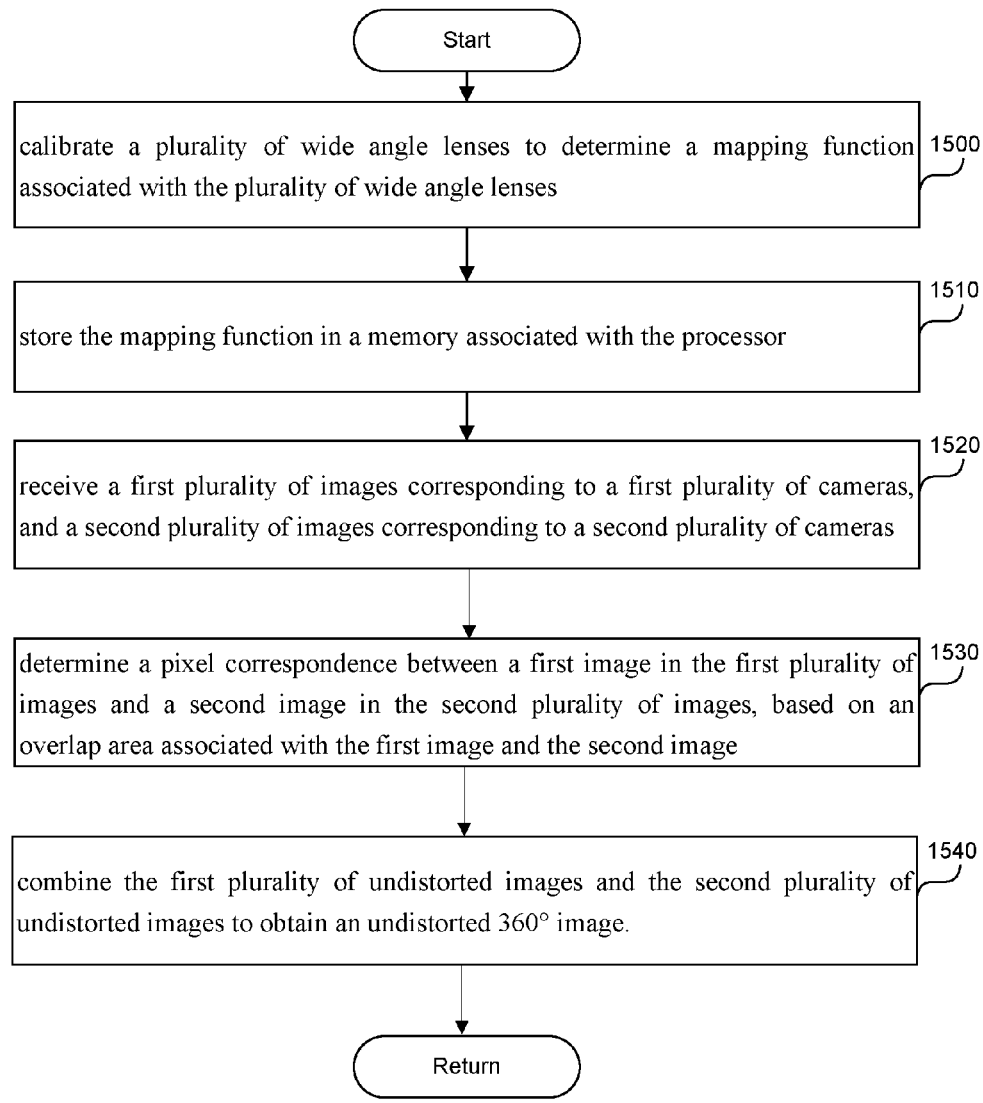
FIGS. 15, 16A-16C explain a process to combine images from various cameras into a single 360° image, according to one embodiment.

FIG. 14C shows an undistorted image obtained by combining images associated with the first plurality of cameras and images associated with the second plurality of cameras, according to one embodiment. A processor receives images associated with the first plurality of cameras, and images associated with the second plurality of cameras, and combines the images to produce an undistorted image. The image shown is a 180° image associated with a first wide angle lens in the first plurality of cameras. The processor can produce a similar 180° image associated with a second wide angle lens in the first plurality of cameras.

FIGS. 15, 16A-16C explain a process to combine images from various cameras into a single 360° image, according to one embodiment. In step 1500, a processor calibrates a plurality of wide angle lenses to determine the distortion associated with the plurality of wide angle lenses. The processor determines a mapping function between an image recorded by each wide angle lens in the first plurality of cameras, and an equivalent image recorded by a normal lens. The equivalent image is the image taken by the normal lens when the normal lens is positioned and oriented same as the wide angle lens. The mapping function includes a transformation, where when the transformation is applied to the image recorded by the wide angle lens, the processor produces the equivalent image recorded by the normal lens.

In step 1510, the processor stores the mapping function in a memory associated with the processor.

In step 1520, the processor receives a first plurality of images corresponding to a first plurality of cameras, and a second plurality of images corresponding to a second plurality of cameras. The first plurality of cameras comprises a plurality of wide angle lenses, where the second plurality of cameras can comprise a plurality of wide angle lenses, and/or can comprise a plurality of normal lenses.

In step 1530, the processor determines a pixel correspondence between a first plurality of images recorded by the first plurality of cameras, and the second plurality of images recorded by the second plurality of images, for a given relative position of the first and second plurality of cameras. The pixel correspondence is a mapping between a subset of pixels in the first plurality of images and a corresponding subset of pixels in the second plurality of images. The relative positions of the first and second plurality of cameras can vary, as described above. For example, the first plurality of cameras can rotate using a swivel.

In one embodiment, in determining pixel correspondence, the processor determines the area 1400 in FIG. 14A associated with a normal lens, and the corresponding area 1430 in FIG. 14B associated with a wide angle lens. The processor establishes a one-to-one correspondence between each pixel in the area 1400 in FIG. 14A each pixel in the area 1420 FIG. 14B.

Figure 16A:
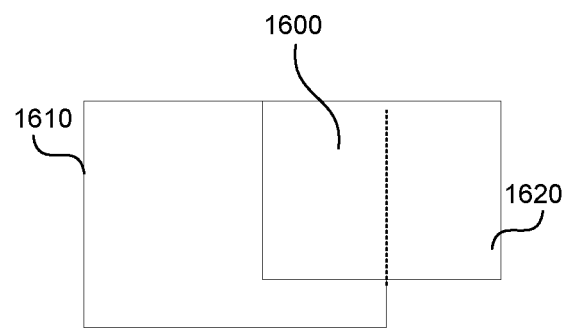

To determine the pixel correspondence, the processor applies the mapping function to each distorted image in the first plurality of images, to obtain a first plurality of undistorted images. When the second plurality of images is recorded by wide angle lenses, the processor applies the mapping function to each distorted image in the second plurality of images, to obtain a second plurality of undistorted images. When the second plurality of images is recorded by normal lenses, the processor does nothing, and the second plurality of images becomes the second plurality of undistorted images. Referring to FIG. 16A, the processor overlaps the undistorted image 1610 in the first plurality of images, and a corresponding undistorted image 1620 in the second plurality of images and calculates a match score between the two overlapping areas.

Figure 16B:
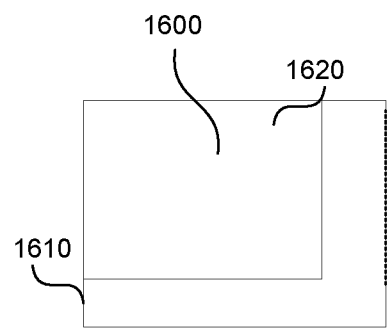
Figure 16C:
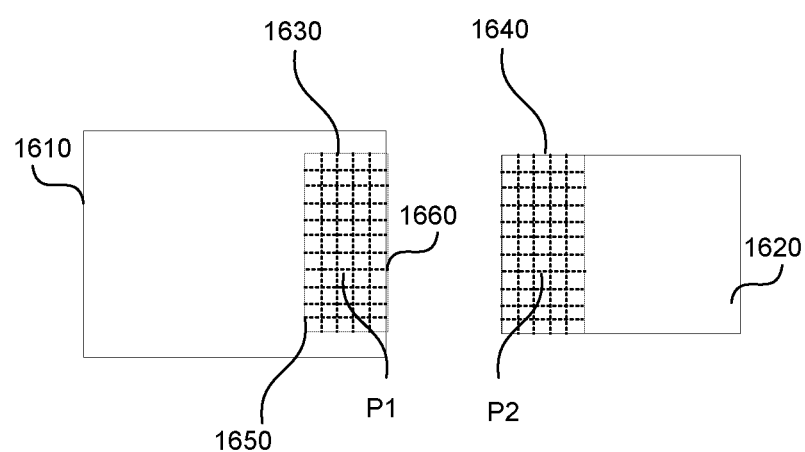

In one embodiment, the processor determines a maximum overlap area between the two images. For example, when the lens associated with the image 1610 is at a 90° angle from the lens associated with the image 1620, the processor overlaps the undistorted image 1610, and the image 1620 as shown in FIG. 16A. The potential maximum overlap area 1600 between the two images is from the middle of the image 1620 to the left edge of the image 1620, where the middle of the image 1620 is aligned with the left edge of the image 1610 as shown in FIG. 16A. In another embodiment, the processor overlaps images 1610 and 1620, fully, as shown in FIG. 16B.

Starting with the maximum overlap, whether partial or full, the processor moves the images with respect to each other pixel line by pixel line, both vertically and horizontally until there is no overlapping pixel between images 1610, 1620, and calculates a match score for each overlap area. The match score can be calculated using various image matching algorithms, such as least-squares match. Based on the overlap areas 1630, 1640 in FIG. 16C with the highest match score, the processor determines the pixel correspondence between the two areas.

In step 1540, the processor combines the first plurality of undistorted images and the second plurality of undistorted images to obtain an undistorted 360° image. In the overlap areas 1630, 1640 in FIG. 16B, between the two images, the processor combines the pixels associated with the first plurality of images and the second plurality of images by assigning weights from 0 to 1 each pixel, so that the sum of weights always equals to one. For example let's say pixel P1 is associated with the overlap area 1630 in FIG. 16B and a corresponding pixel P2 is associated the overlap area 1640 in FIG. 16B. The processor creates a new pixel P0, which equals to $W1*P1+(1-W1)*P2$, where $0 \leq W1 \leq 1$. The weight W1 is determined based on the distance of pixel P1 to an inner edge 1650 associated with the overlap area. When the pixel P1 is right next to the edge 1650, W1 is 1. The weight W1 decreases until W1 reaches 0, at an outer edge 1660. The decrease can be linear, quadratic, cubic, etc., or the decrease can be discreet so that after a specified distance from the edge 1650, the weight W1 becomes 0. The specified distance can be one pixel, two pixels, etc., up to half of the pixels contained in the area 1630.

Additional method steps may be performed to create various embodiments described herein.

Computer

Figure 17:
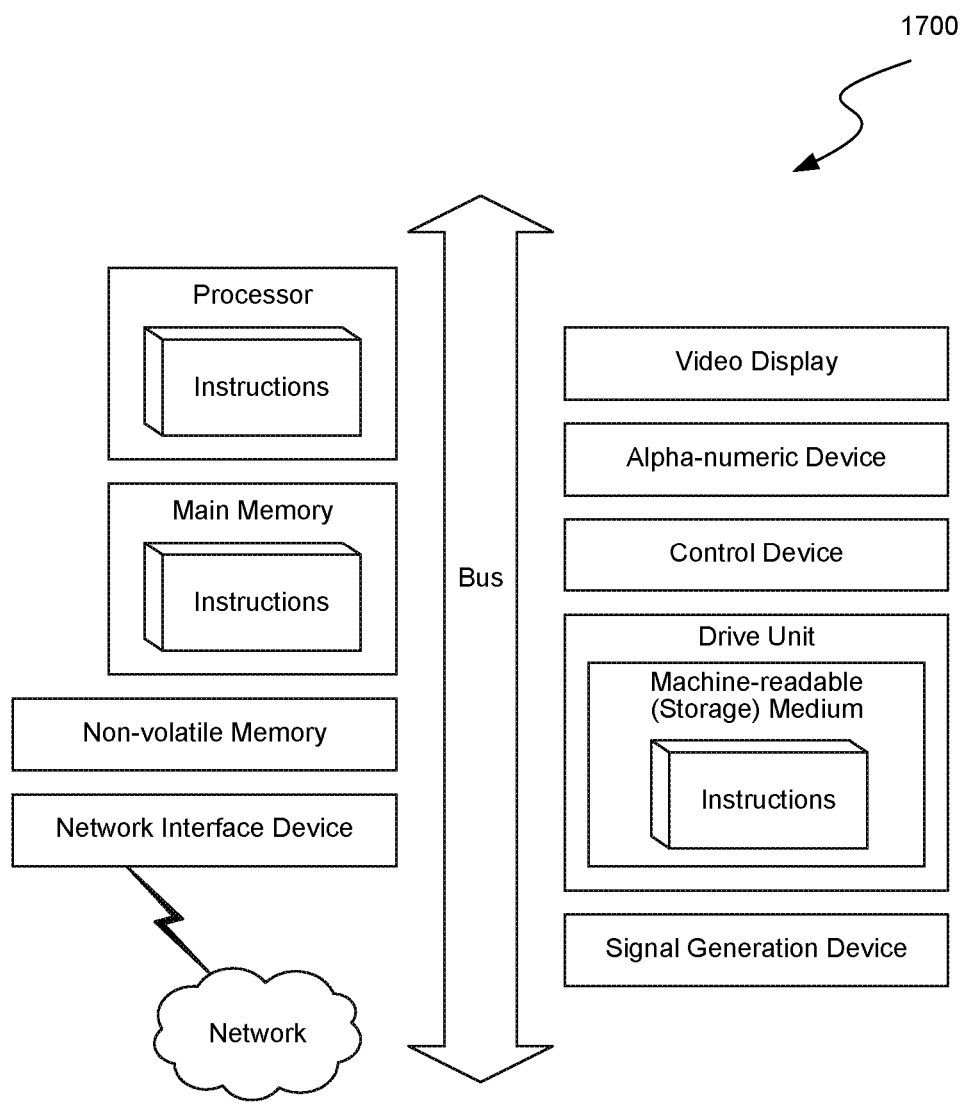
FIG. 17 is a diagrammatic representation of a mobile device in the example form of a computer system within which the above-described apparatus may be implemented, and within which a set of instructions for causing the machine to perform any one or more of the methodologies or modules discussed herein may be executed.

FIG. 17 is a diagrammatic representation of a machine in the example form of a computer system 1700 within which a set of instructions, for causing the machine to perform any one or more of the methodologies or modules discussed herein, may be executed.

In the example of FIG. 17, the computer system 1700 includes a processor, memory, non-volatile memory, and an interface device. Various common components (e.g., cache memory) are omitted for illustrative simplicity. The computer system 1700 is intended to illustrate a hardware device on which any of the components described in the example of FIGS. 1-16C (and any other components described in this specification) can be implemented. The computer system 1700 can be of any applicable known or convenient type. The components of the computer system 1700 can be coupled together via a bus or through some other known or convenient device.

This disclosure contemplates the computer system 1700 taking any suitable physical form. As example and not by way of limitation, computer system 1700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1700 may include one or more computer systems 1700; be unitary or distributed; span multiple locations; span multiple machines; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

The processor may be, for example, a conventional microprocessor such as an Intel Pentium microprocessor or Motorola PowerPC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 1700. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1700. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 17 reside in the interface.

In operation, the computer system 1700 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. An imaging device capable of recording an undistorted full view of a surrounding environment, the imaging device comprising:
a first plurality of cameras associated with a mobile device, the first plurality of cameras comprising a plurality of fisheye lenses distributed evenly around the first plurality of cameras, wherein the first plurality of cameras is configured to record a first plurality of images distorted at a plurality of image edges;

a second plurality of cameras integrated with the mobile device, the second plurality of cameras comprising a plurality of normal lenses evenly distributed around the second plurality of cameras, wherein each normal lens in the plurality of normal lenses is oriented in a direction substantially equally angularly distant from directions of at least two fisheye lenses in the plurality of fisheye lenses, wherein the second plurality of cameras is configured to record a second plurality of images associated with the surrounding environment, wherein each image in the second plurality of images comprises a second image center undistorted by a camera in the second plurality of cameras, wherein the second plurality of image centers associated with the second plurality of images overlaps the plurality of image edges associated with the first plurality of images, wherein the first plurality of cameras and the second plurality of cameras are configured to record the first plurality of images and the second plurality of images synchronously; and a processor configured to combine the first plurality of images and the second plurality of images into an image undistorted by the plurality of fisheye lenses.

2. The imaging device of claim 1, the first plurality of cameras comprising a mobile device accessory configured to attach to the mobile device.

3. The imaging device of claim 1, comprising a swivel configured to dispose the first plurality of cameras to assume a first position, wherein the first position enables the first plurality of cameras to record a third plurality of images.

4. The imaging device of claim 1, the first plurality of cameras integrated into the mobile device, the first plurality of cameras movably disposed inside a camera port associated with the mobile device, the first plurality of cameras configured,
when the first plurality of cameras is inactive, to retract inside the camera port, and to align with an outside casing associated with the mobile device, and the first plurality of cameras configured,
when the first plurality of cameras is active, to protrude from the outside casing associated with the mobile device, and to position the plurality of fisheye lenses to receive light unobstructed by the mobile device.

5. The imaging device of claim 1, the second plurality of cameras comprising:

a front lens proximate to a display associated with the mobile device;
a back lens disposed in a direction opposite of the front lens;
a plurality of photo sensors; and
an array of light deflectors associated with the front lens, the back lens, and the plurality of photo sensors, the array of light deflectors changing a direction of a light beam, the array of light deflectors operable to assume a first position, and a second position, the first position deflecting a light beam associated with the front lens to the plurality of photo sensors associated with the camera, and the second position deflecting a light beam associated with the back lens to the plurality of photo sensors associated with the camera.

6. The imaging device of claim 1, the second plurality of cameras comprising a front camera proximate to a display associated with the mobile device, and a back facing camera disposed in a direction opposite of the front camera.

7. The imaging device of claim 1, the second plurality of cameras occupying a portion of a display screen associated with the mobile device, the portion of the display screen occupied by the camera appearing to be a camera icon, the camera icon operable to activate the camera when the camera icon is selected.

8. The mobile device of claim 7, the camera icon operable to launch a camera application on the mobile device when the camera icon is selected.

9. An imaging device capable of recording an undistorted full view of a surrounding environment, the imaging device comprising:

a first plurality of cameras comprising a plurality of wide angle lenses, wherein the first plurality of cameras is configured to record a first plurality of images distorted at a plurality of image edges;

a second plurality of cameras comprising a plurality of normal lenses, wherein the second plurality of cameras is configured to record a second plurality of images associated with the surrounding environment, wherein each normal lens in the plurality of normal lenses is oriented in a direction substantially equally angularly distant from directions of at least two fisheye lenses in the plurality of fisheye lenses, wherein each image in the second plurality of images comprises a second image center undistorted by a camera in the second plurality of cameras, wherein the second plurality of image centers associated with the second plurality of images overlaps the plurality of image edges associated with the first plurality of images.

10. The imaging device of claim 9, wherein the plurality of wide angle lenses are distributed evenly around the first plurality of cameras, and wherein the plurality of normal lenses are distributed evenly around the second plurality of cameras.

11. The imaging device of claim 9, wherein the first plurality of cameras and the second plurality of cameras are configured to record the first plurality of images and the second plurality of images synchronously.

12. The imaging device of claim 9, wherein a wide angle lens in the plurality of wide-angle lenses comprises a fisheye lens.

13. The imaging device of claim 9, wherein the first plurality of cameras comprises a mobile device accessory, and wherein the second plurality of cameras is integrated into a mobile device.

14. The imaging device of claim 9, wherein the imaging device comprises an elongated stand, each elongated stand attached to the imaging device at a juncture disposed between two normal lenses in the plurality of normal lenses, wherein the elongated stand is configured to support the imaging device, when the elongated stand is in contact with a support surface.

15. The imaging device of claim 9, wherein the first plurality of cameras comprises a first mobile device accessory, and wherein the second plurality of cameras comprises a second mobile device accessory.

16. The imaging device of claim 9, comprising a swivel configured to dispose the first plurality of cameras and the second plurality of cameras to assume a first position, wherein the first plurality of cameras is configured to record a third plurality of images, and the second plurality of cameras is configured to record a forth plurality of images, when the first plurality of cameras and the second plurality of cameras assume the first position.

17. The imaging device of claim 16, the swivel configured to automatically rotate the first plurality of cameras and the second plurality of cameras after the first plurality of cameras and the second plurality of cameras record the first plurality of images and the second plurality of images, respectively.

18. The imaging device of claim 9, comprising a processor configured to combine the first plurality of images and the second plurality of images into an image undistorted by the plurality of wide angle lenses.

19. The imaging device of claim 9, the first plurality of cameras integrated into a mobile device, the first plurality of cameras movably disposed inside a camera port associated with the mobile device, the first plurality of cameras configured,
when the first plurality of cameras is inactive, to retract inside the camera port, and to align with an outside casing associated with the mobile device, and
the first plurality of cameras configured,
when the first plurality of cameras is active, to protrude from the outside casing associated with the mobile device, and to position the plurality of wide angle lenses to receive light unobstructed by the mobile device.

20. The mobile device of claim 19, the first plurality of cameras comprising:
a first wide angle lens;
a second wide angle lens;
a plurality of photo sensors; and
an array of light deflectors associated with the first wide angle lens, the second wide angle lens, and the plurality of photo sensors, the array of light deflectors changing a direction of a light beam, the array of light deflectors operable to assume a first position, and a second position, the first position deflecting a light beam associated with the first wide angle lens to the plurality of photo sensors associated with the first plurality of cameras, and the second position deflecting a light beam associated with the second wide angle lens to the plurality of photo sensors associated with the first plurality of cameras.

21. The mobile device of claim 20, the camera comprising an array of micro-electromechanical systems devices corresponding to the array of light deflectors, the array of micro-electromechanical systems devices operable to individually actuate each light deflector in the array of light deflectors.

22. The mobile device of claim 20, each light deflector in the array of light deflectors configured to axially rotate and dispose the array of light deflectors in a curved surface.

23. The imaging device of claim 9, the first plurality of cameras integrated into a mobile device, a camera in the first plurality of cameras occupying a portion of a display screen associated with the mobile device, the portion of the display screen occupied by the camera appearing to be a camera icon, the camera icon operable to activate the camera when the camera icon is selected.

24. The mobile device of claim 23, the camera icon disposed in a portion of the display screen reserved for a plurality of icons corresponding to a plurality of mobile devices operating system functions.

25. An imaging device capable of recording an undistorted full view of a surrounding environment, the imaging device comprising:
a first plurality of cameras associated with a mobile device, the first plurality of cameras comprising a plurality of fisheye lenses oriented in a plurality of directions;
a second plurality of cameras integrated with the mobile device, the second plurality of cameras comprising a plurality of normal lenses, wherein each normal lens in the plurality of normal lenses is oriented in a direction substantially equally angularly distant from directions of at least two fisheye lenses in the plurality of fisheye lenses,
wherein the first plurality of cameras and the second plurality of cameras are configured to record the first plurality of images and the second plurality of images synchronously; and
a processor configured to combine the first plurality of images and the second plurality of images into an image undistorted by the plurality of fisheye lenses.

26. An imaging device capable of recording an undistorted full view of a surrounding environment, the imaging device comprising:
a first plurality of cameras associated with a mobile device, the first plurality of cameras comprising a plurality of fisheye lenses oriented in a plurality of directions substantially equally angularly distant from each other; and
a second plurality of cameras comprising a plurality of normal lenses, wherein each normal lens in the plurality of normal lenses is oriented in a direction substantially equally angularly distant from directions of at least two fisheye lenses in the plurality of fisheye lenses.

* * * * *